(12) United States Patent
Jiang et al.

(10) Patent No.: US 8,791,220 B2
(45) Date of Patent: Jul. 29, 2014

(54) POROUS INORGANIC/ORGANIC HOMOGENOUS COPOLYMERIC HYBRID MATERIALS FOR CHROMATOGRAPHIC SEPARATION AND PROCESS FOR THE PREPARATION THEREOF

(75) Inventors: Zhiping Jiang, Westford, MA (US); John E. O'Gara, Ashland, MA (US); Raymond P. Fisk, Norton, MA (US); Kevin D. Wyndham, Douglas, MA (US); Darryl W. Brousmiche, Marlborough, MA (US)

(73) Assignee: Waters Technologies Corporation, Milford, MA (US)

(*) Notice: Subject to any disclaimer, the term of this patent is extended or adjusted under 35 U.S.C. 154(b) by 0 days.

(21) Appl. No.: 12/433,221

(22) Filed: Apr. 30, 2009

(65) Prior Publication Data

US 2009/0209722 A1 Aug. 20, 2009

Related U.S. Application Data

(60) Division of application No. 11/119,111, filed on Apr. 29, 2005, now abandoned, which is a continuation of application No. PCT/US03/34776, filed on Oct. 30, 2003.

(60) Provisional application No. 60/422,580, filed on Oct. 30, 2002.

(51) Int. Cl.
    *B32B 27/30* (2006.01)
(52) U.S. Cl.
    USPC .......................... 526/279; 428/402; 521/154
(58) Field of Classification Search
    USPC .......................................... 526/279; 428/402
    See application file for complete search history.

(56) References Cited

U.S. PATENT DOCUMENTS

| | | | |
|---|---|---|---|
| 3,892,678 A | 7/1975 | Halasz et al. | |
| 3,935,299 A | 1/1976 | Kiselev et al. | |
| 4,017,528 A | 4/1977 | Unger et al. | |
| 4,029,583 A | 6/1977 | Chang et al. | |
| 4,104,363 A | 8/1978 | Vozka et al. | |
| 4,169,069 A | 9/1979 | Unger et al. | |
| 4,324,689 A | 4/1982 | Shah | |
| 4,327,191 A | 4/1982 | Dromard et al. | |
| 4,724,207 A | 2/1988 | Hou et al. | |
| 4,775,520 A | 10/1988 | Unger et al. | |
| 4,889,632 A | 12/1989 | Svec et al. | |
| 4,911,903 A | 3/1990 | Unger et al. | |
| 4,923,610 A | 5/1990 | Svec et al. | |
| 4,952,349 A | 8/1990 | Svec et al. | |
| 4,983,369 A | 1/1991 | Barder et al. | |
| 5,068,387 A | 11/1991 | Kleyer et al. | |
| 5,071,565 A | 12/1991 | Fritz et al. | |
| 5,108,595 A | 4/1992 | Kirkland et al. | |
| 5,137,627 A | 8/1992 | Feibush | |
| 5,154,822 A | 10/1992 | Simpson et al. | |
| 5,177,128 A | 1/1993 | Lindemann et al. | |
| 5,194,333 A | 3/1993 | Ohnaka et al. | |
| 5,256,386 A | 10/1993 | Nystrom et al. | |
| 5,271,833 A | 12/1993 | Funkenbusch et al. | |
| 5,298,833 A | 3/1994 | Hou | |
| 5,374,755 A | 12/1994 | Neue et al. | |
| 5,378,790 A | 1/1995 | Michalczyk et al. | |
| 5,425,930 A | 6/1995 | Anderson | |
| 5,453,185 A | 9/1995 | Frechet et al. | |
| 5,498,678 A | 3/1996 | Steffier | |
| 5,548,051 A | 8/1996 | Michalczyk et al. | |
| 5,558,849 A | 9/1996 | Sharp | |
| 5,565,142 A | 10/1996 | Deshpande et al. | |
| 5,624,875 A | 4/1997 | Nakanishi et al. | |
| 5,637,135 A | 6/1997 | Ottenstein et al. | |
| 5,650,474 A | 7/1997 | Yamaya et al. | |
| 5,651,921 A | 7/1997 | Kaijou et al. | |
| 5,667,674 A | 9/1997 | Hanggi et al. | |
| 5,670,257 A * | 9/1997 | Sakai et al. .................. | 428/402 |
| 5,728,457 A | 3/1998 | Frechet et al. | |
| 5,734,020 A | 3/1998 | Wong | |
| 5,856,379 A | 1/1999 | Shiratsuchi et al. | |
| 5,869,152 A | 2/1999 | Colon | |
| 5,965,202 A | 10/1999 | Taylor-Smith et al. | |
| 5,976,479 A | 11/1999 | Alcaraz et al. | |
| 6,017,632 A | 1/2000 | Pinnavaia et al. | |
| 6,022,902 A | 2/2000 | Koontz | |
| 6,027,643 A | 2/2000 | Small et al. | |
| 6,090,477 A | 7/2000 | Burchell et al. | |
| 6,136,187 A | 10/2000 | Zare et al. | |
| 6,183,867 B1 | 2/2001 | Barthel et al. | |
| 6,207,098 B1 | 3/2001 | Nakanishi et al. | |
| 6,210,570 B1 | 4/2001 | Holloway | |
| 6,238,565 B1 | 5/2001 | Hatch | |
| 6,248,686 B1 * | 6/2001 | Inagaki et al. ............... | 502/158 |
| 6,271,292 B1 | 8/2001 | Mager et al. | |
| 6,277,304 B1 | 8/2001 | Wei et al. | |

(Continued)

FOREIGN PATENT DOCUMENTS

| | | |
|---|---|---|
| EP | 0852334 | 7/1998 |
| EP | 1163050 | 12/2001 |

(Continued)

OTHER PUBLICATIONS

Feng et al., "Synthesis of polystyrene-silica hybrid mesoporous materials via the nonsurfactant templated sol-gel process", J. Mater. Chem, 2000, 10, 2490-2494.*

(Continued)

*Primary Examiner* — Margaret Moore

(74) *Attorney, Agent, or Firm* — Edwards Wildman Palmer LLP; Nicholas J. DiCeglie, Jr.

(57) ABSTRACT

The present invention relates to porous inorganic/organic homogenous copolymeric hybrid material materials, including particulates and monoliths, methods for their manufacture, and uses thereof, e.g., as chromatographic separations materials.

6 Claims, 1 Drawing Sheet

(56) References Cited

U.S. PATENT DOCUMENTS

| | | | |
|---|---|---|---|
| 6,281,257 | B1 | 8/2001 | Ma et al. |
| 6,288,198 | B1 | 9/2001 | Mechtel et al. |
| 6,313,219 | B1 | 11/2001 | Taylor-Smith |
| 6,380,266 | B1 | 4/2002 | Katz et al. |
| 6,395,341 | B1 | 5/2002 | Arakawa et al. |
| 6,465,387 | B1 | 10/2002 | Pinnavaia et al. |
| 6,476,098 | B1 | 11/2002 | Arakawa et al. |
| 6,528,167 | B2 | 3/2003 | O'Gara |
| 6,686,035 | B2 | 2/2004 | Jiang et al. |
| 7,175,913 | B2 | 2/2007 | O'Gara |
| 7,211,192 | B2 * | 5/2007 | Shea et al ..................... 210/634 |
| 7,223,473 | B2 | 5/2007 | Jiang et al. |
| 7,250,214 | B2 | 7/2007 | Walter et al. |
| 7,488,559 | B2 * | 2/2009 | Inagaki et al. ................ 429/317 |
| 2001/0033931 | A1 | 10/2001 | Jiang et al. |
| 2003/0157811 | A1 | 8/2003 | Walter et al. |
| 2004/0191516 | A1 | 9/2004 | Jiang et al. |
| 2007/0135304 | A1 | 6/2007 | Walter et al. |
| 2007/0215547 | A1 | 9/2007 | O'Gara |
| 2007/0243383 | A1 | 10/2007 | Jiang et al. |
| 2008/0053894 | A1 | 3/2008 | O'Gara |

FOREIGN PATENT DOCUMENTS

| | | | |
|---|---|---|---|
| JP | 2893104 | A | 9/1995 |
| JP | 07247180 | | 9/1995 |
| WO | WO-9858253 | A1 | 12/1998 |
| WO | WO-9937705 | A1 | 7/1999 |
| WO | WO-00/45951 | | 8/2000 |
| WO | WO-0118790 | A1 | 3/2001 |
| WO | 02/37506 | * | 5/2002 |
| WO | WO-03014450 | A1 | 2/2003 |
| WO | WO-03022392 | A1 | 3/2003 |
| WO | WO-2004041398 | A2 | 5/2004 |
| WO | WO-2005079427 | A2 | 9/2005 |

OTHER PUBLICATIONS

Feng et al., "Synthesis of Polymer-Modified Mesoporous Materials via the nonnsurfactant-templated sol-gel process", Polymer Preprints 2000, 41(1), 515-516.*

Wei et al., "Synthesis of Sulfonated Polystyrene-silica Hybrids and Their Application as Ion Exchange Materials", J. Appl. Polym. Science, 1997, 64, pp. 1893-1902.*

Asiaie et al., Sintered Octadecylsilica as Monolithic Column Packing in Capillary Electrochromatography and micro High-Performance LiquidChromatography, Journal of chromatography A, 806 (1998), 251-263}.

Bereznitski, et al., "Characterization of silica-based octyl phases of different bonding density part II. Studies of surface properties andchromatographic selectivity," 1998. J. Chromatogr. A 828:59-73.

Boury, et al., "Generation of porosity in a hybrid organic-inorganic xerogel by chemical treatment," 1999. New J. Chem. 23: 531-538.

Boury, et al., "Hybrid organic-inorganic xerogel access to meso- and microporous silica by thermal and chemical treatment," 1999. Chem. Mater. 11:281-291.

Chujo, et al., "New Preparation Methods for Organic-Inorganic Polymer Hybrids", Mrs Bulletin/May 2001; 389-392.

Collioud, et al., "Oriented and covalent immobilization of target molecules to solid supports: synthesis and application of a light-activatable and thiol-reactive cross-linking reagent," 1993. Bioconjugate 4:528-536.

Czajkowska, et al., "Adsorption, thermogravimetric, and chromatographic studies of bare silicas and silica-based octyl bonded phases," 1998. J. Liq. Chromatogr. Relat. Technol. 21:1957-1977.

Dulay, et al., "Preparation and Characterization of Monolithic Porous Capillary Columns Loaded with Chromatographic Particles", Anal. Chem., 70(23): 5103-5107 (1998).

Feng, et al., "Synthesis of Polymer-Modified Mesoporous Materials Via the Nonsurfactant-Templated Sol-Gel Process", Polymer Preprints 2000, 41(1), 515-516.

Feng, et al., "Synthese of Polystyrene-silica hybrid mesoporous materials via the nonsurfactant-templated . . . ", J. Mater. Chem, 2000, 10, 2490-2494.

Goldstein, et al., "Microwave Sintereing of Amorphous Silica Powders", J. of Mat. Sci. Letters, 16: 310-312 (1997).

Grun et al., Microporous and Mesoporous Materials 1999, 27, pp. 207.

Hileman, F.D. et al. Anal. Chem. 1973, 45, pp. 1126.

Hanson, M. J. Chromatography A, 1993, 656, pp. 369.

Inagaki, S. et al. J. Am. Chem. Soc. 1999, 121, 9611.

Jones, et al., "The oxidation of the carbon-silicon bond," 1996. Tetrahedron, 52(22):7599-7662.

Maskos et al., "Oligonucleotide hybridizations on glass supports: a novel linker for oligonucleotide synthesis and hybridization properties of oligonucleotides synthesised in situ," 1992. Nucleic Acids Research 20(7):1679-1684.

MacBeath et al., "Printing proteins as microarrays for high-throughput function determination," 2000. Science 289:1760-1763.

Nawrocki, et al., "Influence of silica surface chemistry and structure on the properties, structure and coverage of alkyl-bonded phases for high-performance liquid chromatography," 1988. J. of Chromatography 449(1):1-24.

Nawrocki, "Silica surface controversies, strong adsorption sites, their blockage and removal. Part 1," 1991. Chromatographia 31(3-4):177-192.

Neue, et al., "Use of high-performance LC packings from pH 1 to pH 12," 1999 American Laboratory, p. 36-39.

O'Gara, et al., "Simple preparation of $C_8$ HPLC stationary phase with an internal polar functional group," 1995 Analytical Chemistry 67:3809-13.

O'Gara, et al., "Dependence of cyano bonded phase hydrolytic stability on ligand structure and solution pH," 2000 J. Chromatogr. A 893:245-251.

Perry, R.J., Chemtech, 1999, pp. 39.

Petro, M. et al., Chromatographia, 1993, 9/10, pp. 549.

Reynolds, et al., "Submicron sized organo-silica spheres for capillary electrochromatography," 2000 J. Liq. Chrom & Rel. Technol., 23(1):161-173.

Silsesquixanes—An Introduction to Hybrid Inorganic—Organic Composites—Data by Sigma Aldrich. Retrieved Dec. 4, 2006 from http://www.azom.com/details.asp?ArticleID=2934.

Tamao, et al., "Oxidative cleavage of silicon-carbon bonds in organosilicon flourides to alcohols," 1982 Tetrahedron 39(6):983-990.

Tamao, et al., "Hydrogen peroxide oxidation of the silicon-carbon bond in organoalkoxysilanes," 1983 Organometallics 2: 1694-1696.

Tang et al., "Monolithic Columns Containing Sol-Gel Bonded Octadecylsilica for Capillary Electrochrmoatography", J. Chromatogr. A, 837: 35-50 (1999).

Tamaki et al., "Synthesis of polystyrene/silica gel polymer hybrids by in-situ polymerization method", Polymer Bulletin 39, 303-310 (1997).

Tang et al., "Continuous-Bed Columns Containing Sol-Gel Bonded Octadecylsilica for Capillary Liquid Chromatography", J. Microcolumn Separations, 12: 6-12 (2000).

Ueno et al., "Compaction an dSintering Behavior of Silica Particles Surface-Modified by Al Chelate Compounds", Journal of the Ceramic Society of Japan, 109(3): 210-216 (2001).

Unger et al., "Recent developments in the evaluation of chemically bonded silica packings for liquid chromatography," J. Chromatogr. 1976, 125(1): 115-127.

Wei et al., "Synthesis and Biotechnological Application of Vinyl Polyme-Inorganic Hybrid . . . ", Chinese Journal of Polymer Science, vol. 18, No. 1, (2000), 1-7.

Wei et al., "Polymethacrylate-silica Hybrid nanoporous materials . . . ", Adv. Mater. 2000, 12, No. 19, Oct. 2, 1448-1450.

Xin, et al., "Design and Evaluation of a New Capillary Electrochromatography System", Electrophoresis, 20: 67-73 (1999).

Yang et al., "Oxidative cleavage of carbon-silicon bond as a new method to characterize bonded stationary phases on silica gel," 1998 Anal. Chem. 70:2827-2830.

(56) References Cited

OTHER PUBLICATIONS

Tamao, "Oxidative cleavage of the silicon-carbon bond: Development, mechanism, scope, and limitations," 1996 Advances in Silicon Chemistry, 3:1-62.

Chujo et al., "New Preparative Methods for Organic-Inorganic Polymer Hybrids", Polymeric Materials: Science & Engineering 2001, 84, 783-784.

Office Action from Japanese Patent Office dated Jun. 14, 2011 regarding corresponding Japanese Patent Application No. 2007-523612.

Grun, et al., "Novel pathways for the preparation of mesoporous MCM-41 materials: control of porosity and morphology", Microporous and Mesoporous Materials (27) pp. 207-216 (1999).

Grun, M. et al. Microporous and Mesoporous Materials 1999, 27, pp. 207.

Hanson, et al., "Polymer-coated reversed-phase packings in high-performance liquid chromatography," Jour. of Chromatography A, 656, pp. 369-480, (1993).

Hileman, et al., "In Situ Preparation and Evaluation of Open Pore Polyurethane Chromatographic Columns", Anal. Chem. 45(7) p. 45, (1973).

Inagaki, et al., "Novel Mesoporous Materials with a Uniform Distribiton of Organic Groups and Inorganic Oxide in Their Frameworks", J. Am. Chem. Soc. (191) pp. 9611-9614 (1999).

Perry, R. J. Chemtech 1999, pp. 39.

Perry, R.J., "Applications for cross-linked siloxane particles", Chemtech, February, pp. 39, (1999).

Petro et al., "Polymers Immobilized on Silica Gels as Stationary Phases for Liquid Chromatography", Chromatograhia, 37(9/10), p. 549, Nov. 1993.

\* cited by examiner

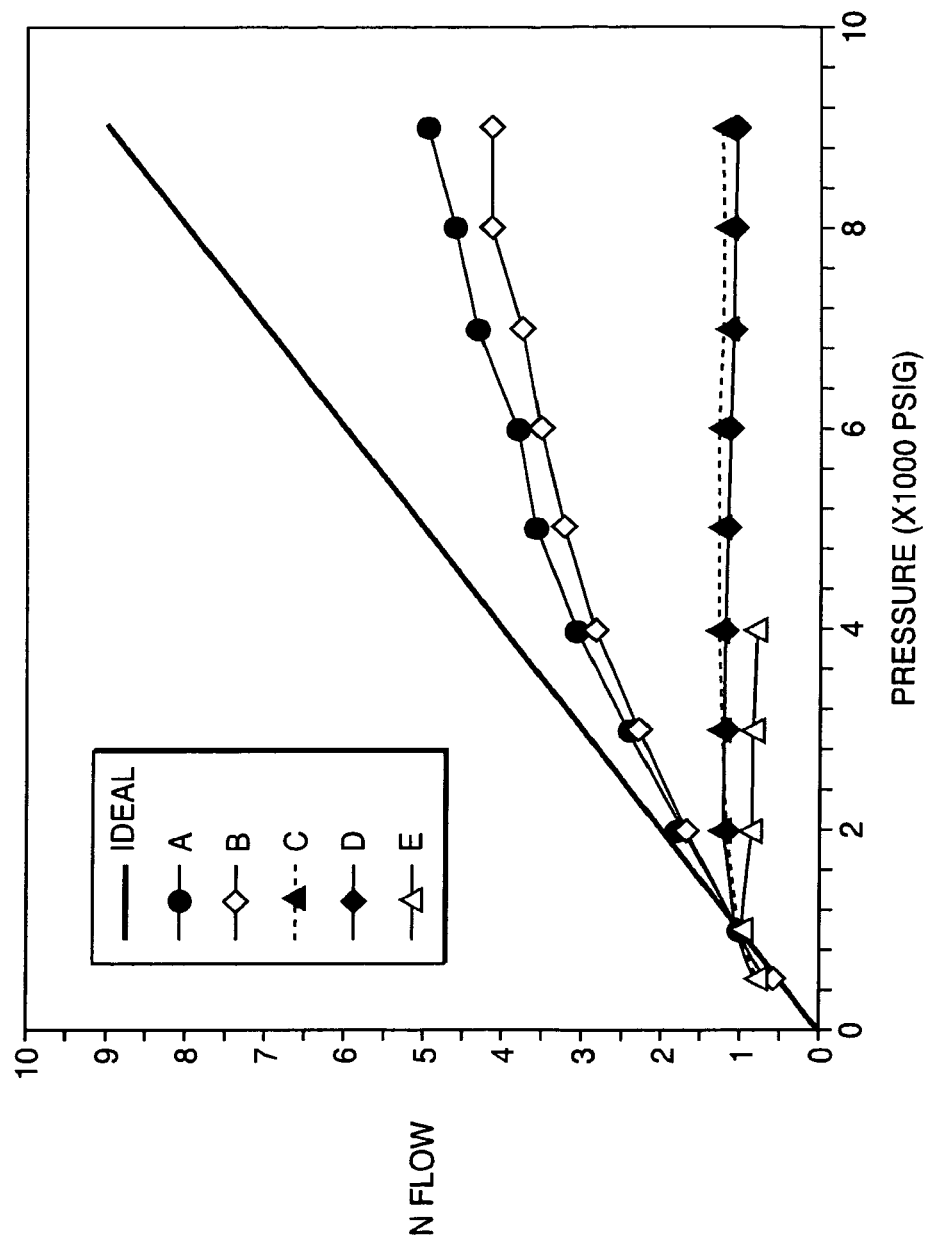

POROUS INORGANIC/ORGANIC HOMOGENOUS COPOLYMERIC HYBRID MATERIALS FOR CHROMATOGRAPHIC SEPARATION AND PROCESS FOR THE PREPARATION THEREOF

RELATED APPLICATIONS

This application is a division of U.S. patent application Ser. No. 11/119,111, filed Apr. 29, 2005, which claims the benefit of and is a continuation of International Application No. PCT/US03/34776, filed Oct. 30, 2003 and designating the United States, which claims the benefit of and priority to U.S. Provisional Application No. 60/422,580, filed Oct. 30, 2002. The entire contents of these applications are incorporated herein by reference.

BACKGROUND OF THE INVENTION

Packing materials for liquid chromatography (LC) are generally classified into two types: organic materials, e.g., polydivinylbenzene, and inorganic materials, e.g., silica.

As stationary phases for HPLC, silica-based materials result in columns that do not show evidence of shrinking or swelling and are mechanically strong. However, limited hydrolytic stability is a drawback with silica-based columns, because silica may be readily dissolved under alkaline conditions, generally pH>8.0, leading to the subsequent collapse of the chromatographic bed. Additionally, the bonded phase on a silica surface may be removed from the surface under acidic conditions, generally pH<2.0, and eluted off the column by the mobile phase, causing loss of analyte retention.

On the other hand, many organic materials are chemically stable against strongly alkaline and strongly acidic mobile phases, allowing flexibility in the choice of mobile phase pH. However, organic chromatographic materials generally result in columns with low efficiency, leading to inadequate separation performance, particularly with low molecular-weight analytes. Furthermore, many organic chromatographic materials shrink and swell when the composition of the mobile phase is changed. In addition, most organic chromatographic materials do not have the mechanical strength of typical chromatographic silica.

In order to overcome the above-mentioned deficiencies while maintaining the beneficial properties of purely organic and purely inorganic materials, others have attempted to simply mix organic and inorganic materials. For example, others have previously attempted to produce such materials for optical sensors or gas separation membranes that are mixtures of organic polymers (e.g., poly(2-methyl-2-oxazoline), poly(N-vinylpyrrolidone), polystyrene, or poly(N,N-dimethylacrylamide) dispersed within silica. See, e.g., Chujo, *Polymeric Materials: Science & Engineering*, 84, 783 (2001); Tamaki, *Polymer Bull.*, 39, 303 (1997); and Chujo, *MRS Bull.*, 389 (May 2001). These materials, however, were not useful for any liquid based separation application because they are translucent and non-porous. As a result, these materials lack capacity as a separation material.

Still others have attempted to make materials that have inorganic and organic components covalently bound to each other. See, e.g., Feng, Q., *J. Mater. Chem.* 10, 2490-94 (2000), Feng, Q., *Polym. Preprints* 41, 515-16 (2000), Wei, Y., *Adv. Mater.* 12, 1448-50 (2000), Wei, Y. *J. Polym. Sci.* 18, 1-7 (2000). These materials, however, only contain very low amounts of organic material, i.e., less than 1% C, and as a result they function essentially as inorganic silica gels. Furthermore, these materials are non-porous until they are ground to irregular particles and then extracted to remove template porogen molecules. Accordingly, it is not possible to make porous monolithic materials that which have a useful capacity as a separation material. Also, irregularly-shaped particles are generally more difficult to pack than spherical particles. It is also known that columns packed with irregularly-shaped particles generally exhibit poorer packed bed stability than spherical particles of the same size. The template agents used in the synthesis of these materials are non-surfactant optically active compounds, and the use of such compounds limits the range of porogen choices and increases their cost. The properties of these materials make them undesirable for use as LC packing materials.

SUMMARY OF THE INVENTION

The present invention provides a solution to the above-mentioned deficiencies. In particular, the present invention relates to a novel material for chromatographic separations, processes for its preparation, and separations devices containing the chromatographic material. For example, the invention pertains to a porous inorganic/organic homogenous copolymeric hybrid material having at least about 10% carbon content by mass. Also, the invention relates to a porous inorganic/organic homogenous copolymeric hybrid material of spherical particles. Additionally, the invention relates to a porous inorganic/organic homogenous copolymeric hybrid monolith material. The present invention provides porous inorganic/organic homogenous copolymeric hybrid materials of the formula:

$$(A)_x(B)_y(C)_z$$

wherein the order of repeat units A, B, and C may be random, block, or a combination of random and block;

A is an organic repeat unit which is covalently bonded to one or more repeat units A or B via an organic bond;

B is an organosiloxane repeat unit which is bonded to one or more repeat units B or C via an inorganic siloxane bond and which may be further bonded to one or more repeat units A or B via an organic bond;

C is an inorganic repeat unit which is bonded to one or more repeat units B or C via an inorganic bond; and x, y are positive numbers and z is a non negative number, wherein when z=0, then 0.002≤x/y≤210, and when z≠0, then 0.0003≤y/z≤500 and 0.002≤x/(y+z)≤210.

Certain other porous inorganic/organic homogenous copolymeric hybrid materials provided by the present invention include those materials of the formula:

$$(A)_x(B)_y(B^*)_{y^*}(C)_z$$

wherein the order of repeat units A, B, B*, and C may be random, block, or a combination of random and block;

A is an organic repeat unit which is covalently bonded to one or more repeat units A or B via an organic bond;

B is an organosiloxane repeat unit which is bonded to one or more repeat units B, B* or C via an inorganic siloxane bond and which may be further bonded to one or more repeat units A or B via an organic bond;

B* is an organosiloxane repeat unit that does not have reactive (i.e., polymerizable) organic components and may further have a protected functional group that may be deprotected after polymerization;

C is an inorganic repeat unit which is bonded to one or more repeat units B or B* or C via an inorganic bond; and x, y are positive numbers and z is a non negative number, wherein when z=0, then $0.002 \leq x/(y+y^*) \leq 210$, and when $z \neq 0$, then $0.0003 \leq (y+y^*)/z \leq 500$ and $0.002 \leq x/(y+y^*+z) \leq 210$.

In particular, one aspect of the invention is a porous inorganic/organic homogenous copolymeric hybrid material (either a monolith or particles) of the formula:

$$(A)_x(B)_y(C)_z \qquad \text{Formula I}$$

wherein the order of repeat units A, B, and C may be random, block, or a combination of random and block; A is an organic repeat unit which is covalently bonded to one or more repeat units A or B via an organic bond (e.g., a polymerized olefin); B is an organosiloxane repeat unit which is bonded to one or more repeat units B or C via an inorganic siloxane bond and which may be further bonded to one or more repeat units A or B via an organic bond; C is an inorganic repeat unit which is bonded to one or more repeat units B or C via an inorganic bond; and $0.0003 \leq y/z \leq 500$ and $0.002 \leq x/(y+z) \leq 210$.

One skilled in the art will appreciate that such materials may have unreacted end groups, e.g., SiOH, Si(OH)$_2$, or Si(OH)$_3$, or unpolymerized olefins.

Additionally, the present invention relates to a novel material for chromatographic separations, processes for its preparation, and separations devices containing the chromatographic material. In particular, one aspect of the invention is a porous inorganic/organic homogenous copolymeric hybrid material of the formula:

$$(A)_x(B)_y(B^*)_{y^*}(C)_z \qquad \text{Formula II}$$

wherein the order of repeat units A, B, B*, and C may be random, block, or a combination of random and block; and A, B, B*, C, x, y, and z are as defined above. The relative stoichiometry of the A to (B+B*) to C components is the same as above, e.g, $0.0003 \leq (y+y^*)/z \leq 500$ and $0.002 \leq x/(y+y^*+z) \leq 210$.

Repeat unit A may be derived from a variety of organic monomer reagents possessing one or more polymerizable moieties, capable of undergoing polymerization, e.g., a free radical-mediated polymerization. A monomers may be oligomerized or polymerized by a number of processes and mechanisms including, but not limited to, chain addition and step condensation processes, radical, anionic, cationic, ring-opening, group transfer, metathesis, and photochemical mechanisms.

Repeat unit B may be derived from several mixed organic-inorganic monomer reagents possessing two or more different polymerizable moieties, capable of undergoing polymerization, e.g., a free radical-mediated (organic) and hydrolytic (inorganic) polymerization. B monomers may be oligomerized or polymerized by a number of processes and mechanisms including, but not limited to, chain addition and step condensation processes, radical, anionic, cationic, ring-opening, group transfer, metathesis, and photochemical mechanisms.

Repeat unit C may be —SiO$_2$— and may be derived from an alkoxysilane, such as tetraethoxysilane (TEOS) or tetramethoxysilane (TMOS).

Another aspect of the invention is a porous inorganic/organic homogenous copolymeric hybrid material of the formula:

$$(A)_x(B)_y \qquad \text{Formula III}$$

wherein the order of repeat units A and B may be random, block, or a combination of random and block; A is an organic repeat unit which is covalently bonded to one or more repeat units A or B via an organic bond (e.g., a polymerized olefin); B is an organosiloxane repeat unit which may or may not be bonded to one or more repeat units B via an inorganic siloxane bond and which may be further bonded to one or more repeat units A or B via an organic bond; and $0.002 \leq x/y \leq 210$.

Repeat unit A may be derived from a variety of organic monomer reagents possessing one or more polymerizable moieties, capable of undergoing polymerization, e.g., a free radical-mediated polymerization. A monomers may be oligomerized or polymerized by a number of processes and mechanisms including, but not limited to, chain addition and step condensation processes, radical, anionic, cationic, ring-opening, group transfer, metathesis, and photochemical mechanisms.

Repeat unit B may be derived from several mixed organic-inorganic monomer reagents possessing two or more different polymerizable moieties, capable of undergoing polymerization, e.g., a free radical-mediated (organic) and hydrolytic (inorganic) polymerization. B monomers may be oligomerized or polymerized by a number of processes and mechanisms including, but not limited to, chain addition and step condensation processes, radical, anionic, cationic, ring-opening, group transfer, metathesis, and photochemical mechanisms.

One skilled in the art will appreciate that such materials may have unreacted end groups, e.g., SiOR, Si(OR)$_2$, or Si(OR)$_3$, where R=H or $C_1$-$C_5$ alkane, or unpolymerized olefins.

Another aspect of the invention is a porous inorganic/organic homogenous copolymeric hybrid material of the formula:

$$(A)_x(B)_y(B^*)_{y^*} \qquad \text{Formula IV}$$

wherein the order of repeat units A, B, and B* may be random, block, or a combination of random and block; A is an organic repeat unit which is covalently bonded to one or more repeat units A or B via an organic bond (e.g., a polymerized olefin); B is an organosiloxane repeat unit which may or may not be bonded to one or more repeat units B or B* via an inorganic siloxane bond and which may be further bonded to one or more repeat units A or B via an organic bond; B* is an organosiloxane repeat unit that does not have reactive (i.e., polymerizable) organic components and may further have a protected functional group that may be deprotected after polymerization. The relative stoichiometry of the A to (B+B*) components is the same as above, e.g., $0.002 \leq x/(y+y^*) \leq 210$.

Repeat unit A may be derived from a variety of organic monomer reagents possessing one or more polymerizable moieties, capable of undergoing polymerization, e.g., a free radical-mediated polymerization. A monomers may be oligomerized or polymerized by a number of processes and mechanisms including, but not limited to, chain addition and step condensation processes, radical, anionic, cationic, ring-opening, group transfer, metathesis, and photochemical mechanisms.

Repeat unit B may be derived from several mixed organic-inorganic monomer reagents possessing two or more different polymerizable moieties, capable of undergoing polymerization, e.g., a free radical-mediated (organic) and hydrolytic (inorganic) polymerization. B monomers may be oligomerized or polymerized by a number of processes and mechanisms including, but not limited to, chain addition and step condensation processes, radical, anionic, cationic, ring-opening, group transfer, metathesis, and photochemical mechanisms.

One skilled in the art will appreciate that such materials may have unreacted end groups, e.g., SiOR, Si(OR)$_2$, or Si(OR)$_3$, where R=H or $C_1$-$C_5$ alkane, or unpolymerized olefins.

By way of example, the present invention pertains to a porous inorganic/organic homogenous copolymeric hybrid material of the formula:

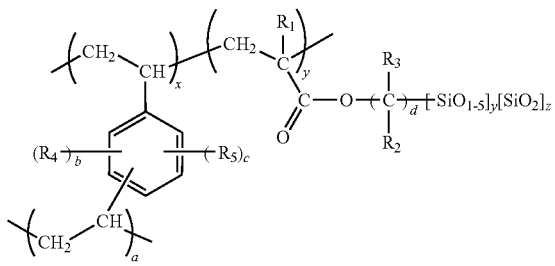

where $R_1$ is H, F, Cl, Br, I, lower alkyl (e.g., $CH_3$ or $CH_2CH_3$); $R_2$ and $R_3$ are each independently H, F, Cl, Br, I, alkane, substituted alkane, alkene, substituted alkene, aryl, substituted aryl, cyano, ether, substituted ether, embedded polar group; $R_4$ and $R_5$ are each independently H, F, Cl, Br, I, alkane, substituted alkane, alkene, substituted alkene, aryl, substituted aryl, ether, substituted ether, cyano, amino, substituted amino, diol, nitro, sulfonic acid, cation or anion exchange groups, $0 \leq a \leq 2x$, $0 \leq b \leq 4$, and $0 \leq c \leq 4$, provided that $b+c \leq 4$ when $a=1$; $1 \leq d \leq 20$, and $0.0003 \leq y/z \leq 500$ and $0.002 \leq x/(y+z) \leq 210$.

The invention also relates to porous inorganic/organic homogenous copolymeric hybrid materials prepared, e.g., by the steps of copolymerizing an organic olefin monomer with an alkenyl-functionalized organosiloxane, and hydrolytic condensation of the product of the other step with a tetraalkoxysilane. The copolymerizing and condensation steps may be performed substantially simultaneously or sequentially.

The material of the invention may be used as a liquid chromatography stationary phase; a sequestering reagent; a solid support for combinatorial chemistry; a solid support for oligosaccharide, polypeptide, or oligonucleotide synthesis; a solid support for a biological assay; a capillary biological assay device for mass spectrometry; a template for a controlled large pore polymer film; a capillary chromatography stationary phase; an electrokinetic pump packing material; a polymer additive; a catalyst; or a packing material for a microchip separation device.

BRIEF DESCRIPTION OF THE DRAWINGS

FIG. 1 is a plot of the mechanical strength results for two porous inorganic/organic homogenous copolymeric hybrid materials of the invention (Examples 3b and 3v; 3 μm fractions), commercially available silica based (5 μm Symmetry® $C_{18}$, Waters Corporation) and polymeric based (7 μm Ultrastyragel™ $10^6$ Å and 7 μm Ultrastyragel™ $10^4$ Å, Waters Corporation) materials wherein the FIGURE legend is A=Symmetry® $C_{18}$, B=3 μm Example 3b, C=3 μm Example 3v, D=7 μm Ultrastyragel™ $10^6$ Å, E=7 μm Ultrastyragel™ $10^4$ Å.

DETAILED DESCRIPTION OF THE INVENTION

The present invention will be more fully illustrated by reference to the definitions set forth below.

The term "monolith" is intended to include a porous, three-dimensional material having a continuous interconnected pore structure in a single piece. A monolith is prepared, for example, by casting precursors into a mold of a desired shape. The term monolith is meant to be distinguished from a collection of individual particles packed into a bed formation, in which the end product comprises individual particles. Such monolith materials are described in detail in international patent application number PCT/US02/25193, filed Aug. 8, 2002, and U.S. provisional patent application No. 60/311,445, filed Aug. 9, 2001, both of which are incorporated herein by reference.

The terms "coalescing" and "coalesced" are intended to describe a material in which several individual components have become coherent to result in one new component by an appropriate chemical or physical process, e.g., heating. The term coalesced is meant to be distinguished from a collection of individual particles in close physical proximity, e.g., in a bed formation, in which the end product comprises individual particles.

As used herein, the term "porous inorganic/organic homogenous copolymeric hybrid material" or "porous inorganic/organic homogenous copolymeric hybrid monolith material" includes materials comprising inorganic repeat units (e.g., comprising O—Si—O bonds between repeat units), organic repeat units (e.g., comprising C—C bonds between repeat units), and mixed organic-inorganic repeat units (e.g., comprising both C—C and O—Si—O bonds between repeat units). The term "porous" indicates that the microscopic structure of the material contains pores of a measurable volume, so that the materials can be used, for example, as solid supports in chromatography. The term "inorganic/organic copolymeric hybrid" indicates that the material comprises a copolymer of organic, inorganic, and mixed organic/inorganic repeat units. The term "homogenous" indicates that the structure of the material at the chemical level is substantially interconnected via chemical bonds, as opposed to the prior art materials that simply comprise mixtures of discrete organic and inorganic materials. The term "hybrid" refers to a material having chemical bonds among inorganic and organic repeat units of a composite material thereby forming a matrix throughout the material itself, as opposed to a mixture of discrete chemical compounds.

Polyorganoalkoxysiloxane (POS) and polyalkylalkoxysiloxane (PAS) are large molecules, either linear or preferably three-dimensional networks, that are formed by the condensation of silanols, where the silanols are formed, e.g., by hydrolysis of halo- or alkoxy-substituted silanes.

As used herein, the term "protecting group" means a protected functional group which may be intended to include chemical moieties that shield a functional group from chemical reaction or interaction such that upon later removal ("deprotection") of the protecting group, the functional group can be revealed and subjected to further chemistry. For example, a monomer used in the synthesis of the materials of the present invention may contain The term also includes a functional group which that does not interfere with the various polymerization and condensation reactions used in the synthesis of the materials of the invention, but which that may be converted after synthesis of the material into a functional group which that may itself be further derivatized. For example, an organic monomer reagent A may contain an aromatic nitro group which that would not interfere with the polymerization or condensation reactions. However, after these polymerization and condensation reactions have been carried out, the nitro group may be reduced to an amino group (e.g., an aniline), which itself may then be subjected to further derivatization by a variety of means known in the art. In this manner, additional functional groups may be incorporated into the material after the syntheses of the material itself. See generally, Greene, T. W. and Wuts, P. G. M. "Protective Groups in Organic Synthesis," Second Edition, Wiley, 1991. In some cases, preferable protecting groups strategies do not involve the use of heavy metals (e.g., transition metals) in the protection or deprotection step as these metals may be difficult to remove from the material completely.

The porous inorganic/organic homogenous copolymeric hybrid particles and monolith materials possess both organic groups and silanol groups which may additionally be substituted or derivatized with a surface modifier. "Surface modifiers" include (typically) organic groups which impart a certain chromatographic functionality to a chromatographic stationary phase. Surface modifiers such as disclosed herein are attached to the base material, e.g., via derivatization or coating and later crosslinking, imparting the chemical character of the surface modifier to the base material. In one embodiment, the organic groups of the hybrid materials react to form an organic covalent bond with a surface modifier. The modifiers may form an organic covalent bond to the material's organic group via a number of mechanisms well known in organic and polymer chemistry including, but not limited to, nucleophilic, electrophilic, cycloaddition, free-radical, carbene, nitrene, and carbocation reactions. Organic covalent bonds are defined to involve the formation of a covalent bond between the common elements of organic chemistry including, but not limited to, hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. In general, the porous inorganic/organic homogenous copolymeric hybrid particles and monolith materials may be modified by an organic group surface modifier, a silanol group surface modifier, a polymeric coating surface modifier, and combinations of the aforementioned surface modifiers.

For example, silanol groups are surface modified with compounds having the formula $Z_a(R')_b Si-R$, where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl. In certain embodiments, the organic groups may be similarly functionalized.

The functionalizing group R may include alkyl, aryl, cyano, amino, diol, nitro, cation or anion exchange groups, or embedded polar functionalities. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, the text of which is incorporated herein by reference. Such groups include those of the general formula

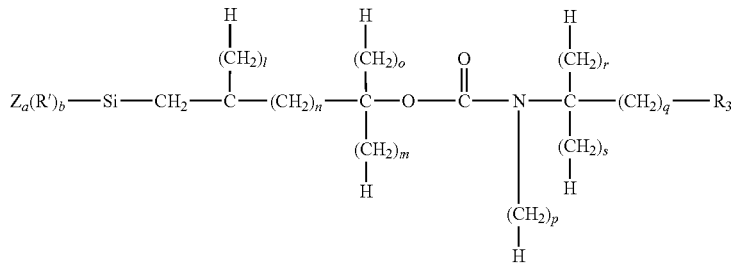

wherein l, m, o, r, and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Preferably, the carbamate functionality has the general structure indicated below:

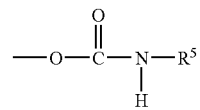

wherein $R^5$ may be, e.g., cyanoalkyl, t-butyl, butyl, octyl, dodecyl, tetradecyl, octadecyl, or benzyl. Advantageously, $R^5$ is octyl, dodecyl, or octadecyl.

In a preferred embodiment, the surface modifier may be an organotrihalosilane, such as octyltrichlorosilane or octadecyltrichlorosilane. In an additional preferred embodiment, the surface modifier may be a halopolyorganosilane, such as octyldimethylchlorosilane or octadecyldimethylchlorosilane. In certain embodiments the surface modifier is octadecyltrimethoxysilane or octadecyltrichlorosilane.

In another embodiment, the hybrid material's organic groups and silanol groups are both surface modified or derivatized. In another embodiment, the hybrid materials are surface modified by coating with a polymer.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains may be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl, and the like. As used herein, the term "nitro" means $-NO_2$; the term "halogen" designates $-F$, $-Cl$, $-Br$ or $-I$; the term "thiol" means SH; and the term "hydroxyl" means $-OH$. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alicyclic group" includes closed ring structures of three or more carbon atoms. Alicyclic groups include cycloparaffins or naphthenes which are saturated cyclic hydrocarbons, cycloolefins which are unsaturated with two or more double bonds, and cycloacetylenes which have a triple bond. They do not include aromatic groups. Examples of cycloparaffins include cyclopropane, cyclohexane, and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents may further comprise a lower alkyl, a lower alkenyl, a lower alkoxy, a lower alkylthio, a lower alkylamino, a lower alkylcarboxyl, a nitro, a hydroxyl, $-CF_3$, $-CN$, or the like.

The term "heterocyclic group" includes closed ring structures in which one or more of the atoms in the ring is an element other than carbon, for example, nitrogen, sulfur, or oxygen. Heterocyclic groups may be saturated or unsaturated and heterocyclic groups such as pyrrole and furan may have aromatic character. They include fused ring structures such as quinoline and isoquinoline. Other examples of heterocyclic groups include pyridine and purine. Heterocyclic groups may also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, $-CF_3$, $-CN$, or the like. Suitable heteroaromatic and heteroalicyclic groups generally will have 1 to 3 separate or fused rings with 3 to about 8 members per ring and one or more N, O or S atoms, e.g., coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, $-CF_3$, $-CN$, or the like.

The term "alkyl" includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more preferably 18 or fewer. Likewise, preferred cycloalkyls have from 4-10 carbon atoms in their ring structure, and more preferably have 4-7 carbon atoms in the ring structure. The term "lower alkyl" refers to alkyl groups having from 1 to 6 carbons in the chain, and to cycloalkyls having from 3 to 6 carbons in the ring structure.

Moreover, the term "alkyl" (including "lower alkyl") as used throughout the specification and claims includes both "unsubstituted alkyls" and "substituted alkyls," the latter of which refers to alkyl moieties having substituents replacing a hydrogen on one or more carbons of the hydrocarbon backbone. Such substituents may include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain may themselves be substituted, if appropriate. Cycloalkyls may be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Aryl groups also include polycyclic fused aromatic groups such as naphthyl, quinolyl, indolyl, and the like. The aromatic ring may be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula $-NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of $R_a$ and $R_b$, is further substituted with an amino group.

Porous inorganic/organic homogenous copolymeric hybrid material of the invention may be made as described below and in the specific instances illustrated in the Examples. Porous spherical particles of hybrid silica may, in one embodiment, be prepared by the steps of (a) hydrolytically condensing an alkenyl-functionalized organosilane with a tetraalkoxysilane, (b) copolymerizing the product of step (a) with an organic olefin monomer, and (c) further hydrolytically condensing the product of step (b) to thereby prepare a porous inorganic/organic homogenous copolymeric hybrid material. In this embodiment, steps (b) and (c) may be performed substantially simultaneously. Steps (a) and (b) may be performed in the same reaction vessel.

Alternatively, the materials of the invention may be prepared by the steps of (a) copolymerizing an organic olefin monomer with an alkenyl-functionalized organosilane, and (b) hydrolytically condensing the product of step (a) with a tetraalkoxysilane in the presence of a non-optically active porogen to thereby prepare a porous inorganic/organic homogenous copolymeric hybrid material. Steps (a) and (b) may be performed in the same reaction vessel.

Also, the materials may be prepared by the steps of substantially simultaneously copolymerizing an organic monomer with an alkenyl-functionalized organosilane and hydrolytically condensing said alkenyl-functionalized organosilane with a tetraalkoxysilane to thereby prepare a porous inorganic/organic homogenous copolymeric hybrid material.

The copolymerizing step of the foregoing methods may be free radical-initiated and the hydrolytically condensing step of the foregoing methods may by acid- or base-catalyzed. In the case of acid catalysis, the acid may be, e.g., hydrochloric acid, hydrobromic acid, hydrofluoric acid, hydroiodic acid, sulfuric acid, formic acid, acetic acid, trichloroacetic acid, trifluoroacetic acid, or phosphoric acid. Likewise, in the case of base catalysis, the base may be ammonium hydroxide, hydroxide salts of the group I and group II metals, carbonate and hydrogencarbonate salts of the group I metals, or alkoxide salts of the group I and group II metals. In the case of free radical-mediated polymerizations, a free radical polymerization initiator may be added. Suitable examples of free radical polymerization initiator include 2,2'-azobis-[2-(imidazolin-2-yl)propane]dihydrochloride, 2,2'-azobisisobutyronitrile, 4,4'-azobis(4-cyanovaleric acid), 1,1'-azobis(cyclohexanecarbonitrile), 2,2'-azobis(2-propionamidine) dihydrochloride, 2,2'azobis(2,4-dimethylpentanenitrile), 2,2'-azobis(2-methylbutanenitrile), benzoyl peroxide, 2,2-bis(tert-butylperoxy)butane, 1,1-bis(tert-butylperoxy)cyclohexane, 2,5-bis(tert-butylperoxy)butane,-2,5-dimethylhexane, 2,5-bis(tert-butylperoxy)-2,5-dimethyl-hexyne, bis(1-(tert-butylperoxy)-1-methyethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene peroxide, cyclohexanone hydroperoxide, dicumyl peroxide, lauroyl peroxide, 2,4-pentanedione peroxide, peracetic acid, and potassium persulfate. Additionally, the reaction may be heated following the addition of the free radical polymerization initiator.

The solvent used in the synthesis of the materials of the invention may be, e.g, water, methanol, ethanol, propanol, isopropanol, butanol, tert-butanol, pentanol, hexanol, cyclohexanol, hexafluoroisopropanol, cyclohexane, petroleum ethers, diethyl ether, dialkyl ethers, tetrahydrofuran, acetonitrile, ethyl acetate, pentane, hexane, heptane, benzene, toluene, xylene, N,N-dimethylformamide, dimethyl sulfoxide, 1-methyl-2-pyrrolidinone, methylene chloride, chloroform, and combinations thereof, although those skilled in the art will readily appreciate that others may be used.

In the synthesis of the materials of the invention, a porogen may be used. Examples of suitable porogens include cyclohexanol, toluene, 2-ethylhexanoic acid, dibutylphthalate, 1-methyl-2-pyrrolidinone, 1-dodecanol, and Triton X-45.

Some examples of organic olefin monomers of the invention include divinylbenzene, styrene, ethylene glycol dimethacrylate, 1-vinyl-2-pyrrolidinone and tert-butylmethacrylate, acrylamide, methacrylamide, N,N'-(1,2-dihydroxyethylene)bisacrylamide, N,N'-ethylenebisacrylamide, N,N'-methylenebisacrylamide, butyl acrylate, ethyl acrylate, methyl acrylate, 2-(acryloxy)-2-hydroxypropyl methacrylate, 3-(acryloxy)-2-hydroxypropyl methacrylate, trimethylolpropane triacrylate, trimethylolpropane ethoxylate triacrylate, tris[(2-acryloyloxy)ethyl] isocyanurate, acrylonitrile, methacrylonitrile, itaconic acid, methacrylic acid, trimethylsilylmethacrylate, N-[tris(hydroxymethyl)methyl]acrylamide (THMMA) (3-acrylamidopropyl)trimethylammonium chloride (APTA), [3-(methacryloylamino)propyl]dimethyl (3-sulfopropyl)ammonium hydroxide inner salt (MAPDAHI),

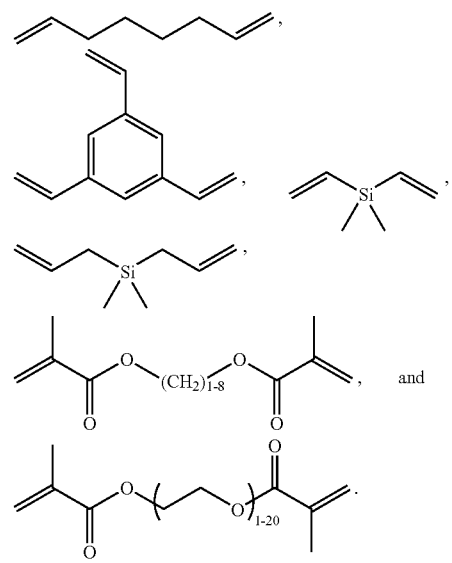

Some examples of alkenyl-functionalized organosiloxane monomers include methacryloxypropyltrimethoxysilane, methacryloxypropyltriethoxysilane, vinyltriethoxysilane, vinyltrimethoxysilane, N-(3-acryloxy-2-hydroxypropyl)-3-aminopropyltriethoxysilane, (3-acryloxypropyl)trimethoxysilane, O-(methacryloxyethyl)-N-(triethoxysilylpropyl) urethane, N-(3-methacryloxy-2-hydroxypropyl)-3-aminopropyltriethoxysilane, methacryloxymethyltriethoxysilane, methacryloxymethyltrimethoxysilane, methacryloxypropylmethyldiethoxysilane, methacryloxypropylmethyldimethoxysilane, methacryloxypropyltris(methoxyethoxy)silane, 3-(N-styrylmethyl-2-aminoethylamino)propyltrimethoxysilane hydrochloride,

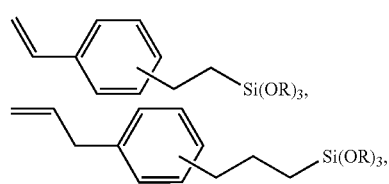

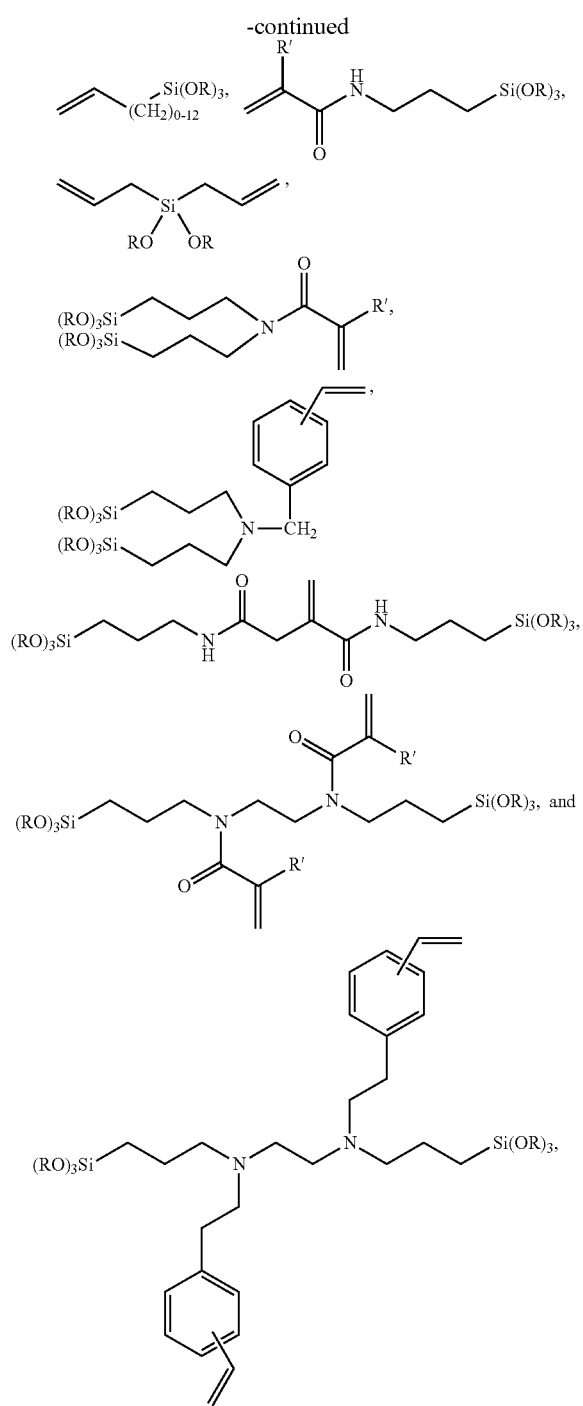

wherein each R is independently H or a C1-C10 alkyl group (preferably hydrogen, methyl, ethyl, or propyl) and wherein R' is independently H or a C1-C10 alkyl group (preferably hydrogen or methyl, ethyl, or propyl). Also, the R groups may be identical and selected from the group consisting of hydrogen, methyl, ethyl, or propyl.

Some examples of tetraalkoxysilanes include tetramethoxysilane, tetraethoxysilane, tetrapropoxysilane, tetrabutoxysilane.

The methods of the invention may also comprise adding a surfactant or stabilizer. Suitable examples of surfactants include Triton X-45, sodium dodecylsulfate, tris(hydroxymethyl)aminomethane, and any combination thereof. Still other examples of surfactants include Triton X100, Triton X305, TLS, Pluronic F-87, Pluronic P-105, Pluronic P-123, sodium dodecylsulfate (SDS), and Triton X-405. Examples of stabilizers include methocel and poly(vinyl alcohol).

The method of the invention may also include a step of endcapping free silanol groups according to methods which are readily known in the art.

The methods of the invention may also include a step of chemically modifying the organic olefin or alkenyl-functionalized organisiloxane prior to copolymerization.

Additionally, the methods of the invention may also include a step of modifying surfaces of the hybrid particles by formation of an organic covalent bond between an organic group of the particle and a surface modifier. In this regard, the method may include a further step of by adding a surface modifier selected from the group consisting of an organic group surface modifier, a silanol group surface modifier, a polymeric coating surface modifier, and combinations thereof, such as $Z_a(R')_bSi$—R, as described herein above. Likewise, the surface modifier may be a polymer coating, such as Sylgard®. Other examples of reagents include octyltrichlorosilane, octadecyltrichlorosilane, octyldimethylchlorosilane, and octadecyldimethylchlorosilane.

In one embodiment of the invention, the surface organic groups of the hybrid silica are derivatized or modified in a subsequent step via formation of an organic covalent bond between the particle's organic group and the modifying reagent. Alternatively, the surface silanol groups of the hybrid silica are derivatized into siloxane organic groups, such as by reacting with an organotrihalosilane, e.g., octadecyltrichlorosilane, or a halopolyorganosilane, e.g., octadecyldimethylchlorosilane. Alternatively, the surface organic and silanol groups of the hybrid silica are both derivatized. The surface of the thus-prepared material is then covered by the organic groups, e.g., alkyl, embedded during the gelation and the organic groups added during the derivatization process or processes.

In one embodiment, the pore structure of the as-prepared hybrid material is modified by hydrothermal treatment, which enlarges the openings of the pores as well as the pore diameters, as confirmed by nitrogen ($N_2$) sorption analysis. The hydrothermal treatment is performed by preparing a slurry containing the as-prepared hybrid material and a solution of organic base in water, heating the slurry in an autoclave at an elevated temperature, e.g., about 143 to 168° C., for a period of about 6 to 28 h. The pH of the slurry can be adjusted to be in the range of about 8.0 to 12.7 using tetraethylammonium hydroxide (TEAH) or TRIS and concentrated acetic acid. The concentration of the slurry is in the range of about 1 g hybrid material per 5 to 10 mL of the base solution. The thus-treated hybrid material is filtered, and washed with water until the pH of the filtrate reaches about 7, washed with acetone or methanol, then dried at about 100° C. under reduced pressure for about 16 h. The resultant hybrid materials show average pore diameters in the range of about 100-300 Å. The surface of the hydrothermally treated hybrid material may be modified in a similar fashion to that of the hybrid material that is not modified by hydrothermal treatment as described in the present invention.

Moreover, the surface of the hydrothermally treated hybrid silica contains organic groups, which can be derivatized by reacting with a reagent that is reactive towards the hybrid materials' organic group. For example, vinyl groups on the material can be reacted with a variety of olefin reactive reagents such as bromine ($Br_2$), hydrogen ($H_2$), free radicals, propagating polymer radical centers, dienes, and the like. In another example, hydroxyl groups on the material can be reacted with a variety of alcohol reactive reagents such as isocyanates, carboxylic acids, carboxylic acid chlorides, and reactive organosilanes as described below. Reactions of this type are well known in the literature, see, e.g., March, J. "Advanced Organic Chemistry," $3^{rd}$ Edition, Wiley, New York, 1985; Odian, G. "The Principles of Polymerization," $2^{nd}$ Edition, Wiley, New York, 1981; the texts of which are incorporated herein by reference.

In addition, the surface of the hydrothermally treated hybrid silica also contains silanol groups, which can be derivatized by reacting with a reactive organosilane. The surface derivatization of the hybrid silica is conducted according to standard methods, for example by reaction with octadecyltrichlorosilane or octadecyldimethylchlorosilane in an organic solvent under reflux conditions. An organic solvent such as toluene is typically used for this reaction. An organic base such as pyridine or imidazole is added to the reaction mixture to catalyze the reaction. The product of this reaction is then washed with water, toluene and acetone and dried at about 80° C. to 100° C. under reduced pressure for about 16 h. The resultant hybrid silica can be further reacted with a short-chain silane such as trimethylchlorosilane to endcap the remaining silanol groups, by using a similar procedure described above.

More generally, the surface of the hybrid silica materials may be surface modified with a surface modifier, e.g., $Z_a(R')_b Si-R$, as described herein above.

The functionalizing group R may include alkyl, alkenyl, alkynyl, aryl, cyano, amino, diol, nitro, cation or anion exchange groups, or alkyl or aryl groups with embedded polar functionalities. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, the text of which is incorporated herein by reference, and as detailed hereinabove. In a preferred embodiment, the surface modifier may be an organotrihalosilane, such as octyltrichlorosilane or octadecyltrichlorosilane. In an additional preferred embodiment, the surface modifier may be a halopolyorganosilane, such as octyldimethylchlorosilane or octadecyldimethylchlorosilane. Advantageously, R is octyl or octadecyl.

The surface of the hybrid silica materials may also be surface modified by coating with a polymer. Polymer coatings are known in the literature and may be provided generally by polymerization or polycondensation of physisorbed monomers onto the surface without chemical bonding of the polymer layer to the support (type I), polymerization or polycondensation of physisorbed monomers onto the surface with chemical bonding of the polymer layer to the support (type II), immobilization of physisorbed prepolymers to the support (type III), and chemisorption of presynthesized polymers onto the surface of the support (type IV). See, e.g., Hanson et al., *J. Chromat. A* 656 (1993) 369-380, the text of which is incorporated herein by reference. As noted above, coating the hybrid material with a polymer may be used in conjunction with various surface modifications described in the invention. In a preferred embodiment, Sylgard® (Dow Corning, Midland, Mich., USA) is used as the polymer.

The term "porogen" refers to a pore forming material, that is a chemical material dispersed in a material as it is formed that is subsequently removed to yield pores or voids in the material.

The term "end capping" a chemical reaction step in which a resin that has already been synthesized, but that may have residual unreacted groups (e.g., silanol groups in the case of a silicon-based inorganic resin) are passivated by reaction with a suitable reagent. For example, again in the case of silicon-based inorganic resins, such silanol groups may be methylated with a methylating reagent such as hexamethyldisilazane.

A stabilizer describes reagents which inhibit the coalescence of droplets of organic monomer and POS or PAS polymers in an aqueous continuous phase. These can include but are not limited to finely divided insoluble organic or inorganic materials, electrolytes, and water-soluble polymers. Typical stabilizers are methyl celluloses, gelatins, polyvinyl alcohols, salts of poly(methacrylic acid), and surfactants. Surfactants (also referred to as emulsifiers or soaps) are molecules which have segments of opposite polarity and solubilizing tendency, e.g., both hydrophilic and hydrophobic segments.

The instant invention relates to a porous inorganic/organic homogenous copolymeric hybrid material having at least about 10% carbon content by mass. In preferred embodiments, the materials of the invention are porous inorganic/organic homogenous copolymeric hybrid particles, particularly spherical particles. The carbon content of the material may be from about 15% to about 90% carbon content by mass, from about 25% to about 75% carbon content by mass, from about 30% to about 45% carbon content by mass, from about 31% to about 40% carbon content by mass, from about 32% to about 40% carbon content by mass, or from about 33% to about 40% carbon content by mass.

In embodiments where the materials of the invention are in the form of particles, they have an average diameter of about 0.1 µm to about 30 to 60 µm, or about 2.0 µm to about 15 µm. The particulate materials of the invention also have a large specific surface area, e.g., about 50-800 $m^2$/g or 400-700 $m^2$/g.

The materials of the invention also have defined pore volumes that may be engineered by choosing an appropriate porogen during synthesis (vide supra). By way of example, the materials of the invention may have specific pore volumes of about 0.25 to 2.5 $cm^3$/g, about 0.4 to 2.0 $cm^3$/g, or 0.5 to 1.3 $cm^3$/g. Likewise, the pore diameters of the material of the invention may be controlled during synthesis (vide supra). For example, the materials of the invention may have an average pore diameter of about 20 to 300 Å, about 50 to 200 Å, or about 75 to 125 Å.

Because of their hybrid nature, the materials of the invention are stable over a broad pH range. Typically, the material may be hydrolytically stable at a pH of about 1 to about 13, about 4 to about 11, about 4 to about 10, about 5 to about 9, or about 6 to about 8.

An advantageous feature of the materials of the invention is their reduced swelling upon solvation with organic solvents than conventional organic LC resins. Therefore, in one embodiment, the material swells by less than about 25% (or 15% or 10% or even 5%) by volume upon solvation with an organic solvent, such as acetonitrile, methanol, ethers (such as diethyl ether), tetrahydrofuran, dichloromethane, chloroform, hexane, heptane, cyclohexane, ethyl acetate, benzene, or toluene.

The materials of the invention, either particles or monoliths, may be surface modified by formation of an organic covalent chemical bond between an inorganic or organic group of the material and a surface modifier. The surface modifier may be an organic group surface modifier, a silanol group surface modifier, a polymeric coating surface modifier, or combinations thereof. For example, the surface modifier may have the formula $Z_a(R')_bSi—R$, as described herein above. Also, the surface modifier may be a polymer coating, such as Sylgard®. Likewise, the surface modifier may be octyltrichlorosilane, octadecyltrichlorosilane, octyldimethylchlorosilane, or octadecyldimethylchlorosilane. Additionally, the surface modifier is a combination of an organic group surface modifier and a silanol group surface modifier; a combination of an organic group surface modifier and a polymeric coating surface modifier; a combination of a silanol group surface modifier and a polymeric coating surface modifier; or a combination of an organic group surface modifier, a silanol group surface modifier, and a polymeric coating surface modifier. The surface modifier may also be a silanol group surface modifier.

The invention also pertains to porous inorganic/organic homogenous copolymeric hybrid monolith materials. In preferred embodiments, the monoliths comprise coalesced porous inorganic/organic homogenous copolymeric hybrid particles having at least about 10% carbon content by mass, about 15% to about 90% carbon content by mass, about 25% to about 75% carbon content by mass, about 30% to about 45% carbon content by mass, about 31% to about 40% carbon content by mass, about 32% to about 40% carbon content by mass, about 30% to about 45% carbon content by mass, about 15 to about 35% carbon content by mass, or about 15 to about 20% carbon content by mass.

The inorganic portion of the hybrid monolith materials of the invention may be alumina, silica, titanium oxide, zirconium oxide, or ceramic materials.

For example, the invention relates to aporous inorganic/organic homogenous copolymeric hybrid material of the formula:

$$(A)_x(B)_y(C)_z \quad \text{Formula I}$$

wherein the order of repeat units A, B, and C may be random, block, or a combination of random and block; A is an organic repeat unit which is covalently bonded to one or more repeat units A or B via an organic bond; B is an organosiloxane repeat unit which is bonded to one or more repeat units B or C via an inorganic siloxane bond and which may be further bonded to one or more repeat units A or B via an organic bond; C is an inorganic repeat unit which is bonded to one or more repeat units B or C via an inorganic bond; and $0.0003 \leq y/z \leq 500$ and $0.002 \leq x/(y+z) \leq 210$. The relative values of x, y, and z may also be $0.003 \leq y/z \leq 50$ and $0.02 \leq x/(y+z) \leq 21$ or $0.03 \leq y/z \leq 5$ and $0.2 \leq x/(y+z) \leq 2.1$.

Similarly, the invention relates to a porous inorganic/organic homogenous copolymeric hybrid material of the formula:

$$(A)_x(B)_y(B^*)_{y^*}(C)_z \quad \text{Formula II}$$

wherein the order of repeat units A, B, B*, and C may be random, block, or a combination of random and block; A is an organic repeat unit which is covalently bonded to one or more repeat units A or B via an organic bond; B is an organosiloxane repeat unit which is bonded to one or more repeat units B or B* or C via an inorganic siloxane bond and which may be further bonded to one or more repeat units A or B via an organic bond, B* is an organosiloxane repeat unit that does not have reactive (i.e., polymerizable) organic components and may further have a protected functional group that may be deprotected after polymerization; C is an inorganic repeat unit which is bonded to one or more repeat units B or B* or C via an inorganic bond; and $0.0003 \leq (y+y^*)/z \leq 500$ and $0.002 \leq x/(y+y^*+z) \leq 210$.

Another aspect of the invention is a porous inorganic/organic homogenous copolymeric hybrid material of the formula:

$$(A)_x(B)_y \quad \text{Formula III}$$

wherein the order of repeat units A and B may be random, block, or a combination of random and block; A is an organic repeat unit which is covalently bonded to one or more repeat units A or B via an organic bond (e.g., a polymerized olefin); B is an organosiloxane repeat unit which may or may not be bonded to one or more repeat units B via an inorganic siloxane bond and which may be further bonded to one or more repeat units A or B via an organic bond; and $0.002 \leq x/y \leq 210$.

Another aspect of the invention is a porous inorganic/organic homogenous copolymeric hybrid material of the formula:

$$(A)_x(B)_y(B^*)_{y^*} \quad \text{Formula IV}$$

wherein the order of repeat units A, B, and B* may be random, block, or a combination of random and block; A is an organic repeat unit which is covalently bonded to one or more repeat units A or B via an organic bond (e.g., a polymerized olefin); B is an organosiloxane repeat unit which may or may not be bonded to one or more repeat units B via an inorganic siloxane bond and which may be further bonded to one or more repeat units A or B via an organic bond; B* is an organosiloxane repeat unit that does not have reactive (i.e., polymerizable) components and has a protected functional group that may be deprotected after polymerization, but added as a third repeat unit. The relative stoichiometry of the A to (B+B*) components is the same as above, e.g., $0.002 \leq x/(y+y^*) \leq 210$.

Repeat unit A may be derived from a variety of organic monomer reagents possessing one or more polymerizable moieties, capable of undergoing polymerization, e.g., a free radical-mediated polymerization. A monomers may be oligomerized or polymerized by a number of processes and mechanisms including, but not limited to, chain addition and step condensation processes, radical, anionic, cationic, ring-opening, group transfer, metathesis, and photochemical mechanisms.

A may also be one of the following:

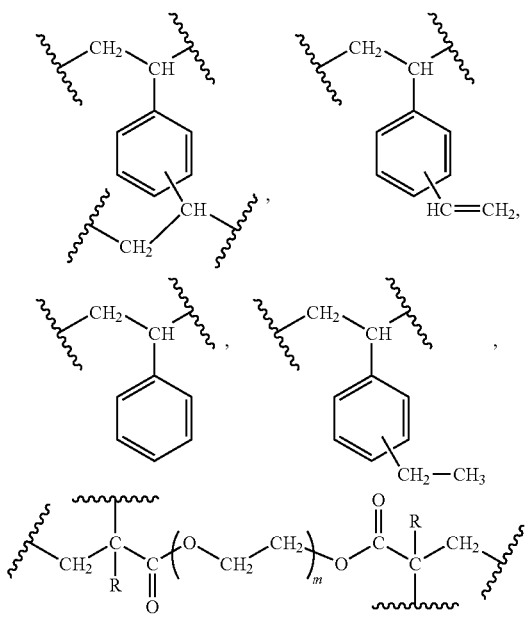

wherein each R is independently H or a $C_1$-$C_{10}$ alkyl group (e.g, methyl, ethyl, or propyl); m is an integer of from 1 to about 20; n is an integer of from 0 to 10; and Q is hydrogen, $N(C_{1-6}alkyl)_3$, $N(C_{1-6}alkyl)_2(C_{1-6}alkylene-SO_3)$, or $C(C_{1-6}hydroxyalkyl)_3$.

Repeat unit B may be derived from several mixed organic-inorganic monomer reagents possessing two or more different polymerizable moieties, capable of undergoing polymerization, e.g., a free radical-mediated (organic) and hydrolytic (inorganic) polymerization. B monomers may be oligomerized or polymerized by a number of processes and mechanisms including, but not limited to, chain addition and step condensation processes, radical, anionic, cationic, ring-opening, group transfer, metathesis, and photochemical mechanisms.

B may also be one of the following:

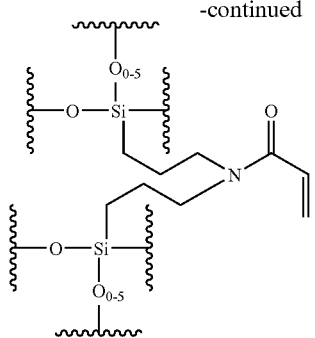

Repeat unit C may be —$SiO_2$— and may be derived from an alkoxysilane, such as tetraethoxysilane (TEOS) or tetramethoxysilane (TMOS).

In one embodiment, A is a substituted ethylene group, B is a oxysilyl-substituted alkylene group, and C is a oxysilyl group, for example the following:

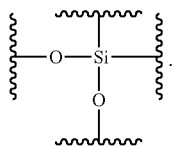

In another example, the invention relates to a porous inorganic/organic homogenous copolymeric hybrid material of the invention may be represented by the following formula:

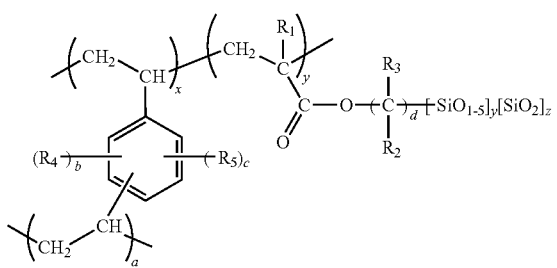

wherein $R_1$ is H, F, Cl, Br, I, lower alkyl (e.g., $CH_3$ or $CH_2CH_3$); $R_2$ and $R_3$ are each independently H, F, Cl, Br, I, alkane, substituted alkane, alkene, substituted alkene, aryl, substituted aryl, cyano, ether, substituted ether, embedded polar group; $R_4$ and $R_5$ are each independently H, F, Cl, Br, I, alkane, substituted alkane, alkene, substituted alkene, aryl, substituted aryl, ether, substituted ether, cyano, amino, substituted amino, diol, nitro, sulfonic acid, cation or anion exchange groups, $0 \leq a \leq 2x$, $0 \leq b \leq 4$, and $0 \leq c \leq 4$, provided that $b+c \leq 4$ when $a=1$; $1 \leq d \leq 20$, and $0.0003 \leq y/z \leq 500$ and $0.002 \leq x/(y+z) \leq 210$.

The invention also relates to materials made by the novel methods of the present invention. For example, the invention pertains to a porous inorganic/organic homogenous copolymeric hybrid material prepared by the steps of (a) copolymerizing an organic olefin monomer with an alkenyl-functionalized organosiloxane, and (b) hydrolytic condensation of the product of step (a) with a tetraalkoxysilane. Likewise, the invention pertains to a porous inorganic/organic copolymeric hybrid material prepared by the steps of (a) copolymerizing an organic olefin monomer with an alkenyl-functionalized organosiloxane, and (b) hydrolytic condensation of the product of step (a) with a tetraalkoxysilane, said material having at least 15% carbon content by mass.

The materials of the invention may be used as a liquid chromatography stationary phase; a sequestering reagent; a solid support for combinatorial chemistry; a solid support for oligosaccharide, polypeptide, or oligonucleotide synthesis; a solid support for a biological assay; a capillary biological assay device for mass spectrometry; a template for a controlled large pore polymer film; a capillary chromatography stationary phase; an electrokinetic pump packing material; a polymer additive; a catalyst; or a packing material for a microchip separation device. The materials of the invention are particularly suitable for use as a HPLC stationary phase or, in general, as a stationary phase in a separations device, such as chromatographic columns, thin layer plates, filtration membranes, sample cleanup devices, and microtiter plates.

The porous inorganic/organic homogenous copolymeric hybrid particles have a wide variety of end uses in the separation sciences, such as packing materials for chromatographic columns (wherein such columns may have improved stability to alkaline mobile phases and reduced peak tailing for basic analytes), thin layer chromatographic (TLC) plates, filtration membranes, microtiter plates, scavenger resins, solid phase organic synthesis supports (e.g., in automated peptide or oligonucleotide synthesizers), and the like having a stationary phase which includes porous inorganic/organic homogenous copolymeric hybrid particles. The stationary phase may be introduced by packing, coating, impregnation, etc., depending on the requirements of the particular device. In a particularly advantageous embodiment, the chromatographic device is a packed chromatographic column, such as commonly used in HPLC.

EXAMPLES

The present invention may be further illustrated by the following non-limiting examples describing the preparation of porous inorganic/organic hybrid materials, and their use.

Example 1

One or more organoalkoxysilanes alone or in combination with a one or more alkoxysilanes (all from Gelest Inc., Tullytown, Pa.) were mixed with an alcohol (HPLC grade, J. T. Baker, Phillipsburgh, N.J.) and 0.1 N hydrochloric acid (Aldrich Chemical, Milwaukee, Wis.) in a flask. The resulting solution was agitated and refluxed for 16 hours in an atmosphere of argon or nitrogen. Alcohol was removed from the flask via distillation at atmospheric pressure. Residual alcohol and volatile species were removed by heating at 115-140° C. for 1-2 hours in a sweeping stream of argon or nitrogen or by heating at 125° C. under reduced pressure for 1-2 hours. The resulting polyorganoalkoxysiloxanes were colorless viscous liquids. The chemical formulas are listed in Table 1 for the organotrialkoxysilanes and alkoxysilanes used to make the product polyorganoalkoxysiloxanes (POS). Specific amounts are listed in Table 2 for the starting materials used to prepare these products. Example 1e was made from 298 g of (3-methacryloxypropyl)trimethoxysilane and 221 g of octyltriethoxysilane. Example 1j was made from bis(trimethoxysilylpropyl)acrylamide and tetramethoxysilane. The bis(trimethoxysilylpropyl)acrylamide was prepared separately from the reaction of 2 equivalents of bis(trimethoxysilylpropyl)amine (Gelest Inc., Tullytown, Pa.) and 1 equivalent of acryloyl chloride (Aldrich Chemical, Milwaukee, Wis.) in dry hexane (HPLC grade, J. T. Baker, Phillipsburgh, N.J.).

The second equivalent of amine sequestered the HCl condensate of the amide formation, where the amine hydrochloride salt was removed from the amide solution by filtration. The product structure was confirmed by $^1$H, $^{13}$C, and $^{29}$Si NMR spectroscopy.

TABLE 1

| Product | Organoalkoxysilanes Chemical Formula | Alkoxysilane Chemical Formula | Alcohol Chemical Formula |
|---|---|---|---|
| 1a | $H_2C$=$C(CH_3)CO_2C_3H_6Si(OCH_3)_3$ | na | $CH_3OH$ |
| 1b | $H_2C$=$C(CH_3)CO_2C_3H_6Si(OCH_3)_3$ | $Si(OCH_3)_4$ | $CH_3OH$ |
| 1c, d | $H_2C$=$C(CH_3)CO_2C_3H_6Si(OCH_3)_3$ | $Si(OCH_2CH_3)_4$ | $CH_3CH_2OH$ |
| 1e | $H_2C$=$C(CH_3)CO_2C_3H_6Si(OCH_3)_3$ and $C_8H_{17}Si(OCH_2CH_3)_3$ | na | $CH_3OH$ |
| 1f, g | $H_2C$=$CHC_6H_4(CH_2)_2Si(OCH_3)_3$ | $Si(OCH_2CH_3)_4$ | $CH_3CH_2OH$ |
| 1h, i | $H_2C$=$CHSi(OCH_2CH_3)_3$ | $Si(OCH_2CH_3)_4$ | $CH_3CH_2OH$ |
| 1j | $H_2C$=$CHCON[C_3H_6Si(OCH_3)_3]_2$ | $Si(OCH_2CH_3)_4$ | $CH_3CH_2OH$ |

TABLE 2

| Product | Organotrialkoxysilane (g) | Alkoxysilane (g) | 0.1N HCl (g) | Alcohol (mL) |
|---|---|---|---|---|
| 1a | 497 | na | 54 | 300 |
| 1b | 497 | 61 | 68 | 300 |
| 1c | 170 | 1428 | 170 | 347 |
| 1d | 671 | 2250 | 304 | 788 |
| 1e | 298 and 221 | na | 54 | 300 |
| 1f | 15 | 355 | 42 | 99 |
| 1g | 20 | 156 | 19 | 47 |
| 1h | 160 | 875 | 119 | 253 |
| 1i | 799 | 1750 | 297 | 736 |
| 1j | 27 | 395 | 47.3 | 229 |

Example 2

A solution of poly(vinyl alcohol) (PVA; 87%-89% hydrolyzed; Ave $M_w$ 13,000-23,000; Aldrich Chemical, Milwaukee, Wis.) in water was prepared by mixing and heating to 80° C. for 0.5 hours. Upon cooling, the PVA solution was combined with a solution comprising divinylbenzene (DVB; 80%; Dow Chemical, Midland, Mich.), a POS selected from Example 1, 2,2'-azobisisobutyronitrile (AIBN; 98%, Aldrich Chemical), and or more of the following coporogens: 2-ethylhexanoic acid (2-EHA; Aldrich Chemical), toluene (HPLC grade, J. T. Baker, Phillipsburgh, N.J.), cyclohexanol (CXL; Aldrich Chemical), 1-methyl-2-pyrrolidinone (NMP; Aldrich Chemical). The two solutions were mixed initially using a mechanical stirrer with Teflon paddle and then emulsified by passing the mixture through a static mixer for 10 minutes under an argon flow. With continuous static mixing, the emulsification was heated to 70-80° C. in a period of 30 minutes. Thereafter, the emulsion was agitated mechanically at 70-80° C. for 16 hours. Upon cooling, the suspension of formed particles was filtered and then washed consecutively with copious amounts of water and then methanol. The particles were then dried at 100° C. at a reduced pressure for 16 hours. Specific reagent amounts and reaction conditions are listed in Table 3. The specific surface areas (SSA), specific pore volumes (SPV) and the average pore diameters (APD) of these materials were measured using the multi-point $N_2$ sorption method and are listed in Table 3 (Micromeritics ASAP 2400; Micromeritics Instruments Inc., Norcross, Ga., or equivalent). The specific surface area was calculated using the BET method, the specific pore volume was the single point value determined for $P/P_0$>0.98, and the average pore diameter was calculated from the desorption leg of the isotherm using the BJH method.

Example 3

A solution of Triton® X-45 (Aq X-45; Fluka, Milwaukee, Wis.), Triton® X-100 (Aq X-100; Fluka, Milwaukee, Wis.), or Methocel E15 (M E15, Dow, Grove City, Ohio; aqueous solution prepared by preheating water to 90° C. before addition of M E15 and cooling to 25° C.) in water and or ethanol was prepared by mixing and heating to 60° C. for 0.5-1.0 hours. In a separate flask, a solution was prepared under a nitrogen purge at ambient temperature by mixing for 0.5 hours divinylbenzene (DVB; 80%; Dow Chemical, Midland, Mich.; washed 3× in 0.1 N NaOH, 3× in water, and then dried $MgSO_4$ from Aldrich Chemical), a POS selected from Example 1, 2,2'-azobisisobutyronitrile (AIBN; 98%, Aldrich Chemical), and one or more of the following reagents: toluene (HPLC grade, J. T. Baker, Phillipsburgh, N.J.), cyclohexanol (CXL; Aldrich, Milwaukee, Wis.), dibutylphthalate (DBP; Sigma; Milwaukee, Wis.), Triton® X-45 (Oil X-45; Fluka, Milwaukee, Wis.). For example 3f, 14 g of Pluronic® F-87 (F-87; BASF; Mount Olive, N.J.), was further added to the aqueous phase prior to mixing. For examples 3k, 3l, 3m, 3n, 3r, and 3v, 0.8 g (3k-3n) and 4.5 g (3r, 3v) of tris(hydroxymethyl)aminomethane lauryl sulfate (TDS; Fluka, Milwaukee, Wis.) was further added to the aqueous solution prior to combination with the oil solution. For examples 3p and 3q, 2.8 and 0.4 grams respectively of poly(vinyl alcohol) (PVA; 87%-89% hydrolyzed; Ave $M_w$ 13,000-23,000; Aldrich Chemical) was further added to the aqueous solution prior to combination with the oil solution. The two solutions were combined and then emulsified using a rotor/stator mixer (Model 100L, Charles Ross & Son Co., Hauppauge, N.Y.) for 4 minutes under an argon flow. Next, a solution of 14.8 M ammonium hydroxide ($NH_4OH$; J. T. Baker, Phillipsburgh, N.J.) was added to the emulsion over a minute, and the emulsification was continued for 20 minutes. For example 3m and 3aa, the mixture was emulsified first, then heated at 80° C. for 1 hour prior to ammonium hydroxide addition. Thereafter, the emulsion was agitated mechanically at 80° C. for 16-24 hours. Upon cooling, the suspension of formed particles was filtered and then washed consecutively with copious amounts of methanol, water and then methanol. The particles were then dried at 80° C. at a reduced pressure for 16 hours. Specific reagent amounts and reaction conditions are listed in Table 4. The specific surface areas (SSA), specific pore volumes (SPV) and the average pore diameters (APD) of these materials are listed in Table 4 and were measured as described in Example 2. The % C values of these materials were measured by combustion analysis (CE-440 Elemental Analyzer; Exeter Analytical Inc., North Chelmsford, Mass., or equivalent).

Example 4

A solution of Triton® X-45 (Aq X-45; Fluka, Milwaukee, Wis.) in water and ethanol was prepared by mixing and heating to 60° C. for 0.5-1.0 hours. In a separate flask, a solution was prepared under a nitrogen purge at ambient temperature by mixing for 0.5 hours one or more organic monomers selected from the following; divinylbenzene (DVB; 80%; Dow Chemical, Midland, Mich.; washed 3× in 0.1 N NaOH, 3× in water, and then dried $MgSO_4$ from Aldrich Chemical), Styrene (STY, 96%; Aldrich Chemical; washed 3× in 0.1 N NaOH, 3× in water, and then dried $MgSO_4$ from Aldrich Chemical), tert-butyl methacrylate (TBM, 98%, Aldrich Chemical), ethylene glycol dimethacrylate (EGD, 98%, Aldrich Chemical), 1,4-Butanediol dimethacrylate (BDM, 95%, Aldrich Chemical), 1-vinyl-2-pyrrolidinone (NVP, 99%, Aldrich Chemical), a POS selected from Example 1, 2,2'-azobisisobutyronitrile (AIBN; 98%, Aldrich Chemical), cyclohexanol (CXL; Aldrich, Milwaukee, Wis.), and Tritong X-45 (Oil X-45; Fluka, Milwaukee, Wis.). The two solutions were combined and then emulsified using a rotor/stator mixer (Model 100L, Charles Ross & Son Co., Hauppauge, N.Y.) for 4 minutes under an argon flow. Next, a solution of 14.8 M ammonium hydroxide ($NH_4OH$; J. T. Baker, Phillipsburgh, N.J.) was added to the emulsion over a minute, and the emulsification was continued for 15 minutes. Thereafter, the emulsion was agitated mechanically at 80° C. for 16-24 hours. Upon cooling, the suspension of formed particles was filtered and then washed consecutively with copious amounts of methanol, water and then methanol. The particles were then dried at 80° C. at a reduced pressure for 16 hours. Specific reagent amounts and reaction conditions are listed in Table 5. The specific surface areas (SSA), specific pore volumes (SPV), the average pore diameters (APD) and the % C of these materials are listed in Table 5 and were measured as described in Examples 2 and 3.

TABLE 3

| Product | POS Reagent | POS (g) | DVB (g) | AIBN (g) | Toluene (mL) | 2-EHA (g) | CXL (g) | NMP (g) | Water (mL) | PVA (g) | % C | SSA ($m^2/g$) | SPV ($cm^3/g$) | APD (Å) |
|---|---|---|---|---|---|---|---|---|---|---|---|---|---|---|
| 2a | 1a | 102 | 174 | 1.8 | 242 | 0 | 0 | 0 | 1500 | 20 | 74.0 | 622 | 0.60 | 45 |
| 2b | 1a | 138 | 138 | 1.8 | 242 | 0 | 0 | 0 | 1480 | 20 | 68.0 | 522 | 0.45 | 38 |
| 2c | 1a | 108 | 174 | 1.8 | 121 | 121 | 0 | 0 | 1500 | 20 | — | 506 | 0.57 | 50 |
| 2d | 1a | 75 | 75 | 1.1 | 0 | 182 | 0 | 0 | 1750 | 16 | — | 434 | 0.72 | 69 |
| 2e | 1a | 55 | 96 | 1.1 | 0 | 182 | 0 | 0 | 1750 | 16 | — | 566 | 0.96 | 82 |
| 2f | 1b | 55 | 96 | 1.1 | 0 | 182 | 0 | 0 | 1750 | 16 | 72.3 | 585 | 1.12 | 95 |
| 2g | 1b | 55 | 96 | 1.1 | 0 | 132 | 0 | 0 | 1750 | 16 | 73.6 | 552 | 0.79 | 71 |
| 2h | 1b | 55 | 96 | 1.1 | 80 | 52 | 0 | 0 | 1750 | 16 | 72.2 | 510 | 0.57 | 51 |
| 2i | 1b | 55 | 96 | 1.1 | 33 | 0 | 99 | 0 | 1750 | 16 | — | 545 | 0.41 | 37 |
| 2j | 1b | 55 | 96 | 1.2 | 83 | 0 | 0 | 83 | 1750 | 16 | — | 512 | 0.34 | 32 |
| 2k | 1b | 60 | 90 | 1.2 | 33 | 0 | 0 | 132 | 1750 | 16 | — | 3 | 3 | 535 |

TABLE 4

| Product | POS Reagent | POS (g) | DVB (mL) | AIBN (g) | Coporogen Type | Coporogen (mL) | Surfactant Type Oil/Aq | Oil Surfactant (g) | Ethanol (mL) | Water (mL) | Aq Surfactant (g) | % C | SSA ($m^2/g$) | SPV ($cm^3/g$) | APD (Å) |
|---|---|---|---|---|---|---|---|---|---|---|---|---|---|---|---|
| 3a | 1c | 58 | 14 | 0.58 | na | na | X-45/X-45 | 3.0 | 66 | 280 | 2.6 | 33.6 | 454 | 0.48 | 46 |
| 3b | 1c | 58 | 14 | 0.10 | toluene | 7 | X-45/X-45 | 3.5 | 66 | 280 | 2.5 | 31.3 | 479 | 0.59 | 50 |
| 3c | 1c | 58 | 11 | 0.11 | toluene | 7 | X-45/X-45 | 11.5 | 66 | 280 | 2.5 | 28.2 | 557 | 0.75 | 55 |
| 3d | 1c | 58 | 14 | 0.15 | CXL | 20 | X-45/X-45 | 3.5 | 66 | 280 | 2.5 | 32.3 | 557 | 0.85 | 64 |
| 3e | 1c | 58 | 14 | 0.19 | CXL | 20 | X-45/X-45 | 11.5 | 66 | 280 | 2.5 | 33.3 | 630 | 1.11 | 72 |
| 3f | 1c | 58 | 14 | 1.78 | na | na | X-45/X-45 | 11.5 | 66 | 280 | 2.5 | 33.7 | 476 | 0.80 | 66 |
| 3g | 1c | 58 | 14 | 1.55 | DBP | 20 | X-45/X-45 | 11.5 | 66 | 280 | 2.5 | 31.2 | 608 | 1.09 | 74 |
| 3h | 1c | 58 | 14 | 1.35 | CXL | 27 | X-45/X-45 | 4.5 | 66 | 280 | 2.5 | 32.4 | 556 | 0.95 | 72 |
| 3i | 1c | 59 | 14 | 0.15 | CXL | 30 | X-45/X-45 | 11.5 | 66 | 280 | 2.5 | 32.3 | 572 | 1.21 | 84 |
| 3j | 1c | 58 | 14 | 0.15 | CXL | 40 | X-45/X-45 | 16.5 | 66 | 280 | 3.5 | 34.1 | 632 | 1.78 | 109 |
| 3k | 1c | 58 | 14 | 0.15 | CXL | 40 | X-45/X-45 | 16.5 | 66 | 280 | 2.5 | 31.8 | 628 | 1.00 | 62 |
| 3l | 1c | 58 | 14 | 0.15 | CXL | 40 | X-45/X-45 | 16.5 | 7 | 280 | 3.5 | 30.6 | 666 | 1.16 | 79 |
| 3m | 1c | 58 | 14 | 0.15 | CXL | 40 | X-45/X-45 | 16.5 | 7 | 280 | 3.5 | 31.3 | 634 | 1.6 | 100 |
| 3n | 1c | 59 | 14 | 0.15 | CXL | 40 | X-45/X-45 | 16.5 | 7 | 280 | 3.5 | 32.5 | 571 | 1.56 | 113 |
| 3o | 1c | 58 | 14 | 0.15 | CXL | 40 | X-45/X-45 | 20.0 | 0 | 280 | 0 | 31.7 | 566 | 1.39 | 96 |
| 3p | 1c | 58 | 14 | 0.15 | CXL | 40 | X-45/X-45 | 20.0 | 0 | 280 | 0 | 34.3 | 545 | 1.49 | 110 |
| 3q | 1c | 58 | 14 | 0.15 | CXL | 40 | X-45/X-45 | 20.0 | 0 | 280 | 0 | 31.4 | 568 | 1.45 | 104 |
| 3r | 1c | 500 | 112 | 1.30 | CXL | 344 | X-45/X-45 | 142 | 60 | 2400 | 30.2 | 31.5 | 573 | 1.67 | 117 |
| 3s | 1c | 58 | 14 | 0.15 | CXL | 40 | X-45/X-45 | 16.5 | 7 | 280 | 3.5 | 31.3 | 608 | 1.51 | 97 |
| 3t | 1c | 58 | 7 | 0.08 | CXL | 36 | X-45/X-45 | 14.5 | 7 | 280 | 3.5 | 24.5 | 592 | 1.86 | 123 |
| 3u | 1c | 45 | 25 | 0.25 | CXL | 40 | X-45/X-45 | 16.5 | 7 | 280 | 3.5 | 50.0 | 604 | 1.40 | 97 |
| 3v | 1c | 500 | 121 | 1.30 | CXL | 344 | X-45/X-45 | 142 | 60 | 2400 | 30.2 | 31.0 | 508 | 1.53 | 116 |
| 3w | 1c | 500 | 121 | 1.30 | CXL | 344 | X-45/X-45 | 142 | 60 | 2400 | 30.2 | 37.4 | 417 | 1.36 | 116 |
| 3x | 1d | 58 | 14 | 0.15 | CXL | 40 | X-45/X-45 | 3.5 | 7 | 280 | 3.5 | 40.7 | 760 | 1.08 | 54 |
| 3y | 1c | 58 | 14 | 0.15 | toluene | 26 | —/X-100 | 0 | 66 | 280 | 14.0 | 37.5 | 514 | 1.09 | 83 |
| 3z | 1c | 58 | 14 | 0.15 | CXL | 14 | —/X-100 | 0 | 14 | 280 | 5.6 | 32.0 | 463 | 0.53 | 51 |
| 3aa | 1c | 58 | 14 | 0.20 | CXL | 18 | —/M E15 | 0 | 0 | 280 | 5.9 | 32.2 | 490 | 0.52 | 45 |
| 3ab | 1j | 50 | 5.0 | 0.02 | toluene | 6 | —/X-100 | 0 | 57 | 241 | 4.8 | 16.9 | 455 | 0.81 | 71.6 |

TABLE 5

| Product | POS Reagent | POS (g) | Organic Monomer | Monomer (mL) | AIBN (g) | Coporogen Type | Coporogen (mL) | Oil X-45 (g) | Ethanol (mL) | Water (mL) | Aq X-45 (g) | % C | SSA (m²/g) | SPV (cm³/g) | APD (Å) |
|---|---|---|---|---|---|---|---|---|---|---|---|---|---|---|---|
| 4a | 1c | 58 | EGD | 14 | 0.17 | CXL | 26 | 3.5 | 66 | 280 | 3.5 | 25.1 | 560 | 0.99 | 77 |
| 4b | 1c | 58 | BDM | 14 | 0.15 | CXL | 26 | 3.5 | 66 | 280 | 3.5 | 25.8 | 528 | 0.93 | 78 |
| 4c | 1c | 58 | DVB/TBM | 14/3 | 0.15 | CXL | 26 | 3.5 | 66 | 280 | 3.5 | 33.9 | 559 | 0.97 | 76 |
| 4d | 1c | 58 | DVB/NVP | 12/3 | 0.15 | CXL | 26 | 3.5 | 66 | 280 | 3.5 | 33.5 | 428 | 0.84 | 74 |
| 4e | 1c | 58 | DVB/STY | 7/7 | 0.15 | CXL | 26 | 3.5 | 66 | 280 | 3.5 | 26.9 | 544 | 0.90 | 70 |
| 4f | 1c | 58 | DVB/STY | 3/11 | 0.15 | CXL | 26 | 3.5 | 66 | 280 | 3.5 | 27.1 | 514 | 0.91 | 72 |
| 4g | 1c | 58 | STY | 14 | 0.15 | CXL | 26 | 3.5 | 66 | 280 | 3.5 | 20.2 | 530 | 0.94 | 71 |

TABLE 6

| Product | POS Reagent | POS (g) | DVB (g) | AIBN (g) | Coporogen Type | Coporogen (g) | SSA (m²/g) | SPV (cm³/g) | APD (Å) |
|---|---|---|---|---|---|---|---|---|---|
| 5a | 1e | 1.3 | 2.2 | 0.04 | 2-EHA | 5.5 | 517 | 0.82 | 88 |
| 5b | 1e | 1.3 | 2.2 | 0.04 | DDL | 5.9 | 452 | 0.71 | 100 |
| 5c | 1e | 1.3 | 2.2 | 0.04 | CXL | 5.5 | 501 | 0.81 | 88 |
| 5d | 1e | 1.3 | 2.2 | 0.04 | toluene/DDL | 3.0/3.0 | 534 | 0.83 | 90 |

Example 5

Pyrex glass tubes (VWR, Bridgeport, N.J.) were derivatized using the following procedure: Treat the glass surface to 2.5 molar sodium hydroxide solution (Aldrich Chemical) for 16 hours at ambient room temperature, wash with copious amounts of water, treat the glass surface with concentrated hydrochloric acid (J. T. Baker) for 1 hour at ambient room temperature, wash with copious amounts of water, and then dry at 100° C. under reduced pressure. The glass surface was subsequently derivatized by treating for 16 hours at 50° C. with a mixture prepared from 19 g of pyridine (J. T. Baker), 12.5 g (3-methacryloxypropyl)trichlorosilane (Gelest Inc.), and 40 g of toluene (HPLC grade, J. T. Baker). The glass tubes were then washed with tetrahydrofuran (THF; J. T. Baker), water, and THF, and then dried at 100° C. and reduced pressure.

To the derivatized tubes were added a solution comprising divinylbenzene (DVB; 80%; Dow Chemical), a POS selected from Example 1, 2,2'-azobisisobutyronitrile (AIBN; 98%, Aldrich Chemical), and on or more of the following coporogens: 2-ethylhexanoic acid (2-EHA; Aldrich Chemical), toluene (HPLC grade, J. T. Baker), cyclohexanol (CXL; Aldrich Chemical), 1-dodecanol (DDL; Aldrich Chemical). The filled tubes were subsequently heated for 20 hours at 75° C. The resultant monolithic materials were washed by Soxhlet extraction using methanol (HPLC grade, J. T. Baker) for 16 hours and then dried at 80-100° C. and reduced pressure. The specific surface areas (SSA), specific pore volumes (SPV) and the average pore diameters (APD) of these materials are listed in Table 6 and were measured as described in Example 2.

Example 6

A solution of Triton® X-45 (Aq X-45; Fluka, Milwaukee, Wis.), Triton® X-100 (Aq X-100; Fluka, Milwaukee, Wis.), Triton® X-165 (Aq X-165; Sigma, St. Louis, Mo.), Triton® X-305 (Aq X-305; Sigma, St. Louis, Mo.), Triton® X-705 (Aq X-705; Sigma, St. Louis, Mo.), or ammonium laurylsulfate (Aq ALS, Fluka, Milwaukee, Wis., 30% solution by weight in water) was prepared by mixing and heating to 60° C. for 0.5-1.0 hours. In a separate flask, a solution was prepared under a nitrogen purge at ambient temperature by mixing for 0.5 hours divinylbenzene (DVB; 80%; Dow Chemical, Midland, Mich.; washed 3× in 0.1 N NaOH, 3× in water, and then dried MgSO₄ from Aldrich Chemical), a POS selected from Example 1, 2,2'-azobisisobutyronitrile (AIBN; 98%, Aldrich Chemical), and on or more of the following reagents: toluene (HPLC grade, J. T. Baker, Phillipsburgh, N.J.), cyclohexanol (CXL; Aldrich, Milwaukee, Wis.), and Triton® X-45 (Oil X-45; Fluka, Milwaukee, Wis.). For example 6b, 6c, and 6k, 0.4-1.9 g of ammonium laurylsulfate (Aq ALS, Fluka, Milwaukee, Wis., 30% solution by weight in water) was further added to the aqueous phase prior to combination with the oil solution. The two solutions were combined and then emulsified using a rotor/stator mixer (Model 100L, Charles Ross & Son Co., Hauppauge, N.Y.) for 13-27 minutes under an argon flow. Next, a solution of 14.8 M ammonium hydroxide (NH₄OH; J. T. Baker, Phillipsburgh, N.J.) was added to the emulsion over a minute, and the emulsification was continued for 20 minutes. Thereafter, the emulsion was agitated mechanically at 80° C. for 16-24 hours. Upon cooling, the suspension of formed particles was filtered and then washed consecutively with copious amounts of methanol, water and then methanol. The particles were then dried at 80° C. at a reduced pressure for 16 hours. Specific reagent amounts and reaction conditions are listed in Table 7. The specific surface areas (SSA), specific pore volumes (SPV), the average pore diameters (APD) and the % C of these materials are listed in Table 7 and were measured as described in Examples 2 and 3.

Example 7

Spherical, porous, hybrid inorganic/organic particles of Examples 3, 4, and 6 were mixed with either tris(hydroxymethyl)aminomethane (TRIS, Aldrich Chemical, Milwaukee, Wis.) or tetraethylammonium hydroxide (35 weight % in water, TEAH, Aldrich Chemical, Milwaukee, Wis.) in a solution comprised of one or more of the following; water, ethanol (HPLC grade, J. T. Baker, Phillipsburgh, N.J.), and pyridine (J. T. Baker, Phillipsburgh, N.J.), yielding a slurry. The resultant slurry was then enclosed in a stainless steel autoclave and heated to between 140-165° C. for 20 hours. After the autoclave cooled to room temperature the product was filtered and washed repeatedly using water and methanol (HPLC grade, J. T. Baker, Phillipsburgh, N.J.), and then dried at 80° C. under vacuum for 16 hours. Specific hydrothermal conditions are listed in Table 8 (mL of base solution/gram of hybrid silica particle, concentration and pH of initial TRIS solution, reaction temperature). The specific surface areas (SSA), specific pore volumes (SPV), the average pore diameters (APD) and the % C of these materials are listed in Table 8 and were measured as described in Examples 2 and 3.

Example 9

The particles of hybrid silica prepared according to Examples 3r, 3v, and 3w were blended and then separated by particle size into ~3, ~5, and ~7 µm fractions. The surface of a 3 µm material fraction was modified with chlorodimethyloctadecylsilane (Aldrich Chemical, Milwaukee, Wis.) as fol-

TABLE 7

| Product | POS Reagent | POS (g) | DVB (mL) | AIBN (g) | Coporogen Type | Coporogen (mL) | Oil X-45 (g) | Ethanol (mL) | Water (mL) | Aqueous Surfactant Type | Aq Surfactant (g) | % C | SSA (m²/g) | SPV (cm³/g) | APD (Å) |
|---|---|---|---|---|---|---|---|---|---|---|---|---|---|---|---|
| 6a | 1c | 58 | 14 | 0.15 | toluene | 10 | 0 | 66 | 300 | X-45 | 4.9 | 32.6 | 475 | 0.57 | 48 |
| 6b | 1c | 58 | 11 | 0.11 | toluene | 7 | 11.5 | 66 | 280 | X-45/ALS | 2.5/1.9 | 28.4 | 557 | 0.74 | 55 |
| 6c | 1c | 58 | 11 | 0.11 | toluene | 7 | 11.5 | 66 | 280 | X-45/ALS | 2.5/0.4 | 29.3 | 567 | 0.81 | 57 |
| 6d | 1c | 58 | 14 | 0.15 | toluene | 10 | 0 | 14 | 300 | X-100 | 7.0 | 31.2 | 491 | 0.57 | 51 |
| 6e | 1c | 58 | 14 | 0.15 | toluene | 10 | 0 | 66 | 300 | X-100 | 7.0 | 34.2 | 518 | 0.64 | 55 |
| 6f | 1c | 58 | 14 | 0.15 | toluene | 10 | 0 | 66 | 300 | X-165 | 7.0 | 32.3 | 463 | 0.65 | 62 |
| 6g | 1c | 58 | 14 | 0.15 | toluene | 10 | 0 | 0 | 300 | X-165 | 7.0 | 31.3 | 427 | 0.55 | 54 |
| 6h | 1c | 58 | 14 | 0.15 | toluene | 10 | 0 | 66 | 300 | X-165 | 1.0 | 31.6 | 392 | 0.49 | 48 |
| 6i | 1c | 58 | 14 | 0.15 | toluene | 10 | 0 | 66 | 300 | X-165 | 0.5 | 33.1 | 396 | 0.51 | 52 |
| 6j | 1c | 58 | 14 | 0.15 | toluene | 10 | 0 | 7 | 300 | X-165 | 7.0 | 33.0 | 446 | 0.56 | 53 |
| 6k | 1c | 58 | 14 | 0.15 | toluene | 10 | 0 | 7 | 300 | X-165/ALS | 7.0/1.1 | 33.0 | 435 | 0.57 | 55 |
| 6l | 1c | 58 | 14 | 0.15 | CXL | 11 | 0 | 7 | 300 | X-165 | 7.0 | 33.9 | 442 | 0.59 | 60 |
| 6m | 1c | 58 | 14 | 0.15 | toluene | 10 | 0 | 66 | 300 | X-305 | 7.0 | 33.0 | 424 | 0.67 | 50 |
| 6n | 1c | 58 | 14 | 0.15 | toluene | 10 | 0 | 0 | 300 | X-305 | 7.0 | 31.7 | 379 | 0.52 | 50 |
| 6o | 1c | 58 | 14 | 0.15 | toluene | 10 | 0 | 66 | 300 | X-705 | 7.0 | 31.3 | 382 | 0.62 | 48 |
| 6p | 1c | 58 | 14 | 0.15 | toluene | 10 | 0 | 132 | 300 | X-705 | 7.0 | 31.9 | 396 | 0.80 | 59 |

TABLE 8

| Product | Precursor | Amount (mL/g) | Ethanol Composition (% Volume) | Pyridine Composition (% Volume) | Base | Conc. (Molarity) | pH | Temp. (° C.) | % C | SSA (m²/g) | SPV (cc/g) | APD (Å) | Loss in SSA (m²/g) |
|---|---|---|---|---|---|---|---|---|---|---|---|---|---|
| 7a | 3i | 5 | 0 | 10 | TRIS | 0.30 | 10.4 | 160 | 32.0 | 547 | 1.28 | 98 | 25 |
| 7b | 3h | 10 | 0 | 30 | TRIS | 0.30 | 10.3 | 160 | 33.0 | 548 | 0.99 | 80 | 8 |
| 7c | 3h | 10 | 0 | 10 | TRIS | 0.60 | 10.5 | 160 | 33.1 | 506 | 0.91 | 81 | 50 |
| 7d | 3e | 10 | 0 | 0 | TEAH | 0.10 | 12.7 | 165 | 35.0 | 469 | 1.09 | 97 | 161 |
| 7e | 3e | 10 | 20 | 0 | TRIS | 0.30 | 10.1 | 155 | 32.3 | 570 | 1.12 | 82 | 60 |
| 7f | 3e | 10 | 20 | 0 | TEAH | 0.10 | 12.7 | 155 | 34.5 | 525 | 1.12 | 90 | 105 |
| 7g | 4e | 10 | 0 | 0 | TEAH | 0.10 | 12.4 | 165 | 27.6 | 373 | 0.86 | 95 | 171 |
| 7h | 4f | 10 | 0 | 0 | TEAH | 0.10 | 12.4 | 165 | 27.3 | 339 | 0.85 | 103 | 175 |
| 7i | 3a | 10 | 0 | 0 | TEAH | 0.10 | 12.7 | 165 | 33.4 | 331 | 0.45 | 56 | 123 |
| 7j | 3c | 10 | 0 | 0 | TEAH | 0.10 | 12.7 | 165 | 28.6 | 397 | 0.76 | 81 | 160 |
| 7k | 6f | 10 | 0 | 0 | TEAH | 0.10 | 12.8 | 165 | 33.6 | 345 | 0.62 | 83 | 118 |

Example 8

The particles of hybrid silica prepared according to Examples 3r, 3v, and 3w were blended and then separated by particle size into ~3, ~5, and ~7 µm fractions. A 5.0 g amount of 3 µm fraction was combined with 100 mL of concentrated sulfuric acid (EM Science, Gibbstown, N.J.) and stirred at room temperature in a 1 L round-bottom flask. After stirring for 1 hour, the solution was slowly added to a stirred solution of 400 mL water, and the mixture was stirred for 10 minutes. The modified hybrid silica particles were filtered and washed successively with water, methanol (J. T. Baker), and then dried at 80° C. under reduced pressure for 16 hours. The particles were analyzed as described in Examples 2 and 3 and shown to have the following properties: 30.3% C, 607 m²/g specific surface area (SSA), 1.51 cc/g specific pore volume (SPV), and 113 Å average pore diameter (APD). The loading of sulfonic acid groups was determined to be 1.0 meq/gram as measured by titration with 0.1 N NaOH (Metrohm 716 DMS Titrino autotitrator with 6.0232.100 pH electrode; Metrohm, Hersau, Switzerland, or equivalent).

lows: $5 \times 10^{-6}$ moles of silane per square meter of particle surface area and 1.6 equivalents (per mole silane) of imidazole (Aldrich Chemical, Milwaukee, Wis.) were added to a mixture of 15 g of hybrid silica particle in 100 mL of toluene (J. T. Baker) and the resultant mixture was refluxed for 20 hours. The modified hybrid silica particles were filtered and washed successively with water, toluene, 1:1 v/v acetone/water, and acetone (all solvents from J. T. Baker), and then dried at 80° C. under reduced pressure for 16 hours. The particles were analyzed as described in Examples 2 and 3 and shown to have the following properties: 40.2% C, 333 m²/g specific surface area (SSA), 1.13 cc/g specific pore volume (SPV), and 118 Å average pore diameter (APD). The surface concentration of octadecylsilyl groups was determined to be 1.44 µmol/m² by the difference in particle % C before and after the surface modification as measured by elemental analysis.

Example 10

The particles of hybrid silica prepared according to Example 3b and 3v were separated by particle size into ~3 µm fractions. The 3 µm fractions were tested for mechanical strength in the following manner: The material of interest was slurry packed using a downward slurry technique in a 3.9×10 mm cartridge at 500 psig to insure no crushing of particles occurs. The column packing apparatus comprised a high-pressure liquid packing pump (Model No: 10-500FS100 SC Hydraulic Engineering Corp., Los Angeles, Calif., or equivalent). After packing, the cartridge was taken off the packing chamber and any excess material was wiped off flush with the cartridge face. The packed cartridge was then reattached to the chamber, which was filled with methanol. The cartridge was subjected to increasing pack pressures where the time to displace 20 mL of methanol was recorded at each 500 psig pressure increments from 500 psig to 9500 psig. Approximately 30 to 40 seconds were allowed at each pressure increment for the packed bed to stabilize at that pressure before the displacement time was measured. The time to displace 20 mL of methanol was then converted into flow rate (mL/min) by dividing the 20 mL displaced by the time (in seconds) and multiplying the result by 60.

| PACKING CONDITIONS | | | |
|---|---|---|---|
| Slurry Solvent: | Methanol | | |
| Restriction: | 0.009" × 60" | | |
| Slurry/Chamber Vol.: | 50 mL | Valve Actuation: | Closed |
| Material Amount: | 0.25 g | Pump Stroke Rate: | 180/min. |
| Pack Pressure: | 500 psig | Displacement: | 55 mL |
| PACK PRESSURE at OPEN FLOW RATES | | | |
| 440 mls/min | 9000 psig | | |
| 360 mls/min | 6000 psig | | |
| 240 mls/min | 3000 psig | | |

The principle of the test is as follows: The packed material in the steel chromatographic cartridge (3.9×10 mm) is exposed to different pressures (500-9000 psig) of a methanol effluent. At high pressures the particle beds of weak materials can compact or crush, which results in a restriction of methanol flow. The closer the methanol flow remains to the linear trend predicted for an ideal particle, the greater the mechanical stability of the packed bed material. As a means to normalize differences in particle size and packing parameters, and make direct comparisons of the effect of pressure on the stability of the base materials, the methanol flow rates are normalized to the flow obtained for the respective columns at 1000 psig back pressure.

A comparison of mechanical strength results is shown in FIG. 1 for commercially available silica based (5 μm Symmetry® $C_{18}$, Waters Corporation) and polymeric based (7 μm Ultrastyragel™ $10^6$ Å and 7 μm Ultrastyragel™ $10^4$ Å, Waters Corporation) materials and the two 3 μm fractions of Examples 3b and 3v. It is evident that the hybrid packing material 3b is mechanically stronger than the polymeric based materials and has comparable strength to the silica based material.

Example 11

A solution was prepared using 5 mL of an acetic acid solution (J. T. Baker, Phillipsburgh, N.J.), Pluronic F-38 (BASF Corporation, Mount Olive, N.J.), 2,2'-azobisisobutyronitrile (AIBN; 98%, Aldrich Chemical, Milwaukee, Wis.) and a water soluble monomer, including N-[tris(hydroxymethyl)methyl]acrylamide (THMMA, Aldrich Chemical, Milwaukee, Wis.), (3-acrylamidopropyl)trimethylammonium chloride (APTA, 75 wt. % solution in water, Aldrich Chemical, Milwaukee, Wis.), [3-(methacryloylamino)propyl]dimethyl(3-sulfopropyl)ammonium hydroxide inner salt (MAPDAHI, Aldrich Chemical) or polyethylene glycol dimethacrylate (PEGDMA, Aldrich Chemical). This mixture was stirred for 2 hours at room temperature, and then sonicated for 5 minutes. A 2 mL aliquot of a 4:1 v/v mixture of tetramethylorthosilicate (TMOS, Aldrich Chemical, Milwaukee, Wis.) and 3-(trimethoxysilyl)propylmethacrylate (MAPTMOS, Aldrich Chemical, Milwaukee, Wis.) was added to the solution, which was then stirred in an ice water bath for 1 hour, and for a further 1 hour at room temperature. The solution was transferred to a cylindrical glass container, and placed in an oven for 16-24 hours at 45° C. Following removal from the cylindrical container, the monoliths were rinsed with water and then left for 24 hours in a 0.1 N ammonium hydroxide solution at 65° C. After this treatment, the monoliths were washed with water, refluxed in methanol for 24 hours, and then dried for 16-24 hours at 85° C. under reduced pressure. Specific reagent amounts and reaction conditions are listed in Table 9. The specific surface areas (SSA), specific pore volumes (SPV), the average pore diameters (APD) and the % C of these materials are listed in Table 9 and were measured as described in Examples 2 and 3.

TABLE 9

| Product | Monomer | Monomer Amount (g) | F-38 (g) | AIBN (mg) | AcOH (Molarity) | % C | SSA ($m^2/g$) | SPV ($cm^3/g$) | APD (Å) |
|---|---|---|---|---|---|---|---|---|---|
| 11a | PEGDMA- $M_n$ ~875 | 0.4987 | 0.2001 | 5.7 | 0.02 | 29.5 | 380 | 0.38 | 40 |
| 11b | PEGDMA- $M_n$ ~875 | 0.7569 | 0.2001 | 6.5 | 0.02 | 23.2 | 260 | 0.33 | 47 |
| 11c | PEGDMA- $M_n$ ~875 | 0.7557 | 0.3980 | 5.8 | 0.10 | 19.7 | 232 | 0.3 | 46 |
| 11d | PEGDMA- $M_n$ ~875 | 1.0099 | 0.3992 | 5.8 | 0.02 | 19.9 | 205 | 0.38 | 57 |
| 11e | PEGDMA- $M_n$ ~875 | 0.5021 | 0.4019 | 5.1 | 0.01 | 16.3 | 494 | 0.7 | 60 |
| 11f | PEGDMA- $M_n$ ~258 | 0.5052 | 0.2052 | 5.5 | 0.02 | 32.1 | 411 | 0.4 | 41 |
| 11g | PEGDMA- $M_n$ ~258 | 0.5091 | 0.1985 | 5.5 | 0.01 | 27.3 | 505 | 0.5 | 43 |
| 11h | PEGDMA- $M_n$ ~258 | 0.5132 | 0.4017 | 5.4 | 0.01 | 27.3 | 270 | 0.28 | 41 |
| 11i | MAPDAHI | 0.5003 | 0.2026 | 5.2 | 0.02 | 16.3 | 539 | 0.63 | 48 |
| 11j | MAPDAHI | 0.5021 | 0.4007 | 5.4 | 0.02 | 15.1 | 542 | 0.66 | 49 |
| 11k | MAPDAHI | 0.5006 | 0.6000 | 5.9 | 0.02 | 15.4 | 536 | 1.25 | 109 |
| 11l | APTA | 0.6661 | 0.4008 | 7.3 | 0.02 | 15.9 | 459 | 1.33 | 133 |
| 11m | APTA | 0.6533 | 0.4012 | 7.5 | 0.05 | 16.1 | 484 | 1.18 | 107 |
| 11n | THMMA | 0.5368 | 0.4062 | 5.6 | 0.01 | 14.9 | 575 | 0.66 | 49 |
| 11o | THMMA | 0.5311 | 0.4019 | 5.2 | 0.05 | 17.3 | 583 | 0.53 | 38 |

Example 12

Monoliths synthesized in Example 11 were placed in a stainless steel autoclave and immersed in a solution of 0.3 N tris(hydroxymethyl)aminomethane (TRIS, Aldrich Chemical, Milwaukee, Wis.). The solution was then heated to 155° C. for 22 hours. After the autoclave cooled to room temperature the products were washed repeatedly using water and methanol (HPLC grade, J. T. Baker, Phillipsburgh, N.J.), and then dried at 85° C. under reduced pressure. The specific surface areas (SSA), specific pore volumes (SPV), the average pore diameters (APD) and the % C of these materials are listed in Table 10 and were measured as described in Examples 2 and 3.

TABLE 10

| Product | Precursor | % C  | SSA ($m^2/g$) | SPV ($cm^3/g$) | APD (Å) |
|---------|-----------|------|---------------|----------------|---------|
| 12a     | 11a       | 28.3 | 145           | 0.28           | 60      |
| 12b     | 11c       | 31.6 | 104           | 0.23           | 65      |
| 12c     | 11e       | 20.6 | 149           | 0.67           | 172     |
| 12d     | 11f       | 29.9 | 75            | 0.13           | 47      |
| 12e     | 11g       | 27.3 | 76            | 0.21           | 70      |

Example 13

Monoliths made by the formulation of Examples 11e and 11h were immersed in glass vials containing a) dichloromethane, b) diethyl ether, c) toluene, d) methanol, e) water (pH 10—NaOH), f) water (pH 3—HCl), g) acetonitrile, h) dimethylsulfoxide, i) hexanes or j) tetrahydrofuran for 24 hours. The diameter and length of each of the monoliths showed no dimensional changes in any of the solvents within experimental error as measured by electronic caliper (Model 62379-531, Control Company, Friendswood, Tex. or equivalent).

Example 14

A solution of poly(vinyl alcohol) (PVA; 87%-89% hydrolyzed; Ave $M_w$ 13,000-23,000; Aldrich Chemical, Milwaukee, Wis.) in 1000 mL water was prepared by mixing and heating to 80° C. for 0.5 hours. Upon cooling, the PVA solution was combined with a solution comprising divinylbenzene (DVB; 80%; Dow Chemical, Midland, Mich.), N-vinyl pyrrolidinone (NVP, Aldrich Chemical, Milwaukee, Wis.), 3-(trimethoxysilyl)propyl methacrylate (MAPTMOS, Aldrich Chemical, Milwaukee, Wis.), 2,2'-azobisisobutyronitrile (AIBN; 98%, Aldrich Chemical), and toluene (HPLC grade, J. T. Baker, Phillipsburgh, N.J.). The two solutions were mixed initially using a mechanical stirrer with Teflon paddle and then emulsified by passing the mixture through a static mixer for 30 minutes under an argon flow. The emulsion was heated to 70° C. with mechanical agitation, and left to stir at this temperature for 16 hours. Upon cooling, the suspension of formed particles was filtered and then washed consecutively with copious amounts of hot water (80-100° C.) and then methanol. The particles were then dried at 85° C. at a reduced pressure for 16 hours. Specific reagent amounts and reaction conditions are listed in Table 11. The specific surface areas (SSA), specific pore volumes (SPV), the average pore diameters (APD) and the % C of these materials are listed in Table 11 and were measured as described in Examples 2 and 3.

TABLE 11

| Product | DVB (g) | AIBN (g) | Toluene (mL) | NVP (g) | MAPTMOS (g) | PVA (g) | % C  | SSA ($m^2/g$) | SPV ($cm^3/g$) | APD (Å) |
|---------|---------|----------|--------------|---------|-------------|---------|------|---------------|----------------|---------|
| 14a     | 175     | 1.9      | 243          | 77.3    | 39          | 20      | 79.8 | 622           | 0.81           | 64      |
| 14b     | 174     | 1.9      | 243          | 103     | 77          | 20      | 77.3 | 394           | 0.32           | 35      |
| 14c     | 175     | 1.9      | 244          | 103     | 39          | 20      | 80.0 | 642           | 0.81           | 60      |

Example 15

Spherical, porous, hybrid inorganic/organic particles of Example 14 were mixed in either 1.0 or 2.5 M solutions of NaOH in water (Aldrich Chemical, Milwaukee, Wis.), yielding a suspension. The resultant suspension was then heated at 85-100° C. for 24-48 hours. After the reaction was cooled to room temperature the products were filtered and washed repeatedly using water and methanol (HPLC grade, J. T. Baker, Phillipsburgh, N.J.), and then dried at 80° C. under vacuum for 16 hours. This processing yielded free silanol groups, as evidenced by $^{29}Si$ CP-MAS NMR spectroscopy. Specific amounts and conditions are listed in Table 12 (mL base solution/gram hybrid particle, base concentration, reaction temperature, and reaction time). The specific surface areas (SSA), specific pore volumes (SPV), the average pore diameters (APD) and the % C of these materials are listed in Table 12 and were measured as described in Examples 2 and 3.

TABLE 12

| Product | Precursor | Base Amount (mL/g) | Base Conc. (Molarity) | Time (h) | Temp. (° C.) | % C  | SSA ($m^2/g$) | SPV ($cm^3/g$) | APD (Å) |
|---------|-----------|--------------------|-----------------------|----------|--------------|------|---------------|----------------|---------|
| 15a     | 14a       | 2.5                | 1.0                   | 24       | 85           | 79.8 | 675           | 0.86           | 65      |
| 15b     | 14b       | 2.5                | 1.0                   | 24       | 85           | 76.6 | 536           | 0.40           | 35      |
| 15c     | 14c       | 2.5                | 1.0                   | 24       | 85           | 79.0 | 700           | 0.90           | 63      |

Incorporation by Reference

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. The contents of all references, issued patents, and published patent applications cited throughout this application are hereby incorporated by reference.

What is claimed is:

1. A porous inorganic/organic homogenous copolymeric hybrid material of the formula:

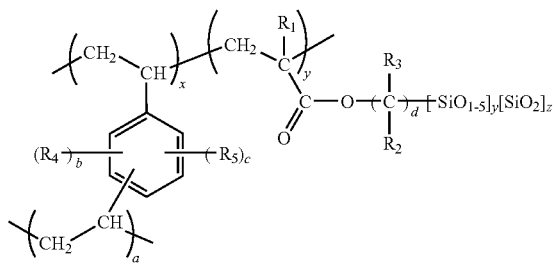

wherein $R_1$ is H, F, Cl, Br, I, lower alkyl;

$R_2$ and $R_3$ are each independently H, F, Cl, Br, I, alkane, substituted alkane, alkene, substituted alkene, aryl, substituted aryl, cyano, ether, substituted ether, embedded polar group;

$R_4$ and $R_5$ are each independently H, F, Cl, Br, I, alkane, substituted alkane, alkene, substituted alkene, aryl, substituted aryl, ether, substituted ether, cyano, amino, substituted amino, diol, nitro, sulfonic acid, cation or anion exchange groups, $0 \leq a \leq 2$, $0 \leq b \leq 4$, and $0 \leq c \leq 4$, provided that $b+c \leq 4$ when $a=1$; $1 \leq d \leq 20$, $0.0003 \leq y/z \leq 500$ and $0.002 \leq x/(y+z) \leq 210$;

wherein the porous inorganic/organic homogenous copolymeric hybrid material has specific pore volumes of about 0.25 to 2.5 cm$^3$/g and an average pore diameter of about 20 to 300 Å.

2. A separations device comprising a material according to claim 1.

3. The separations device according to claim 2, wherein said device is selected from the group consisting of chromatographic columns, thin layer plates, filtration membranes, sample cleanup devices, and microtiter plates.

4. The material according to claim 1, wherein $0.003 \leq y/z \leq 50$ and $0.02 \leq x/(y+z) \leq 21$.

5. The material according to claim 1, wherein said material has a specific surface area of about 50-800 m$^2$/g.

6. The material according to claim 1, wherein said material is hydrolytically stable at a pH of about 1 to about 13.

* * * * *